US012280457B2

(12) United States Patent
Clark

(10) Patent No.: US 12,280,457 B2
(45) Date of Patent: Apr. 22, 2025

(54) MANAGEMENT SYSTEM FOR HARD DRIVE DISMANTLING SYSTEM

(71) Applicant: Serenity Data Security, LLC, Carbondale, IL (US)

(72) Inventor: Kevin P. Clark, Carbondale, IL (US)

(73) Assignee: Serenity Data Security, LLC, Carbondale, IL (US)

( * ) Notice: Subject to any disclaimer, the term of this patent is extended or adjusted under 35 U.S.C. 154(b) by 992 days.

(21) Appl. No.: 17/196,311

(22) Filed: Mar. 9, 2021

(65) Prior Publication Data
US 2021/0213573 A1 Jul. 15, 2021

Related U.S. Application Data

(63) Continuation-in-part of application No. 15/900,066, filed on Feb. 20, 2018, now Pat. No. 11,167,384, which is a continuation-in-part of application No. 15/516,609, filed as application No. PCT/US2016/040812 on Jul. 1, 2016, now Pat. No. 10,926,298.

(60) Provisional application No. 62/188,055, filed on Jul. 2, 2015.

(51) Int. Cl.
B23P 19/06     (2006.01)
B02C 23/08     (2006.01)
B03B 9/06      (2006.01)
C22B 59/00     (2006.01)
G06F 21/80     (2013.01)
G06Q 10/30     (2023.01)
G06Q 30/0283   (2023.01)

(52) U.S. Cl.
CPC .............. *B23P 19/06* (2013.01); *B02C 23/08* (2013.01); *B03B 9/061* (2013.01); *C22B 59/00* (2013.01); *G06F 21/80* (2013.01); *G06Q 10/30* (2013.01); *G06Q 30/0283* (2013.01); *G06F 2221/2143* (2013.01)

(58) Field of Classification Search
None
See application file for complete search history.

(56) References Cited

U.S. PATENT DOCUMENTS

| | | | | |
|---|---|---|---|---|
| 11,256,799 | B2 * | 2/2022 | Forehand | G06F 21/57 |
| 2018/0236459 | A1 * | 8/2018 | Clark | G06F 21/80 |
| 2020/0270725 | A1 * | 8/2020 | McIntyre | C22B 59/00 |
| 2020/0363790 | A1 * | 11/2020 | Harper | G05B 19/41865 |

* cited by examiner

Primary Examiner — Jan P Mincarelli
(74) Attorney, Agent, or Firm — Alix, Yale & Ristas, LLP

(57) ABSTRACT

A management system for a hard drive dismantling system automatically monitors the operation and the output of the dismantling system either remotely or onsite. In one embodiment, the number of hard drives processed by the system is determined and a contract value is determined in real-time. A distributed ledger is employed. Payments are automatically transferred between a customer and a service provider according to a contractual arrangement. The market values of various components, such as rare earth materials, are also optionally provided.

18 Claims, 31 Drawing Sheets

Non-Destructive Hard Drive Dismantling Machine's Operating System

Barcode reader system

Database of all manufacturer's barcodes of 3.5 inch and 2.5 inch HDDs, SSds, and HHds.

Capacity to capture corporate asset tags.

Capacity to read QR and Matrix Codes.

Capacity to save the retrieved information as a Word document or convert it to a PDf that can be stored for future use or delivered electronically to another computer, smartphone or tablet.

Product visioning system

Pictorial database of targeted components in all 3.5 inch and 2.5 inch HDDs, SSDs, and HHDs. The primary components consist of: the hard drive cover, circuit boards, flat cable, head assembly, spindle hub, information platters, rare earth metals: spindle coils, and voice-coil magnets.

Corresponding X, Y, and Z numerical coordinates to aid in the identification and extraction of the targeted components based on the desired outcome of the system's operator.

G-code/conversational programming system

Pictorial database of targeted components in all 3.5 inch and 2.5 inch HDDs, SSDs, and HHDs. The primary components consist of: the hard drive cover, circuit boards, flat cable, head assembly, spindle hub, information platters, rare earth metals: spindle coils, and voice-coil magnets.

Corresponding X, Y, and Z numerical coordinates to guide the tool path of the screw removal and/or milling tool of targeted components from the outside to the inside of hard drives based on the desired outcome of the system's operator.

Pictorial database of targeted components like circuit boards in all 3.5 inch and 2.5 inch hard drives as well as rare earth metals: spindle coils, and voice-coil magnets in 3.5 inch and 2.5 inch HDDs, and HHDs.

Corresponding X, Y, and Z numerical coordinates to aid in the identification and extraction of targeted components based on the desire outcome of the system's operator.

FIG. 1a

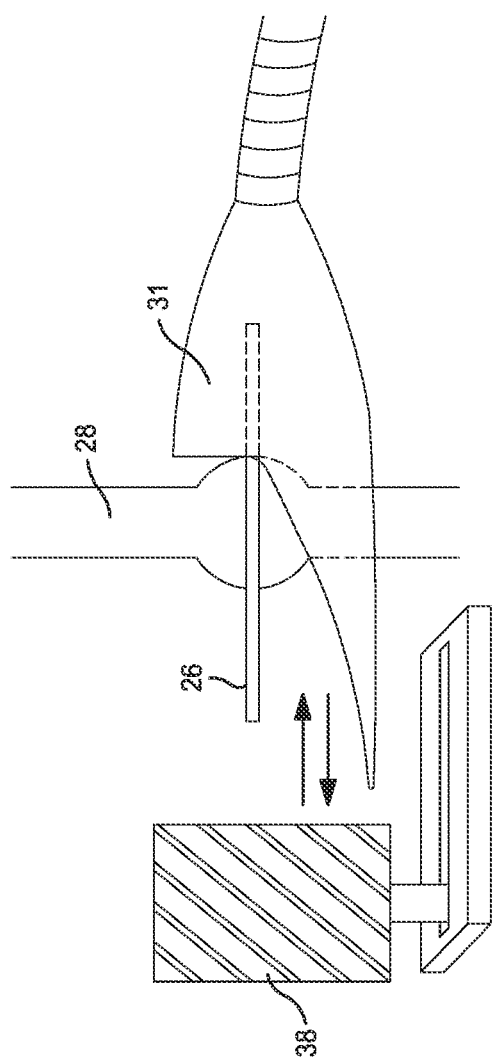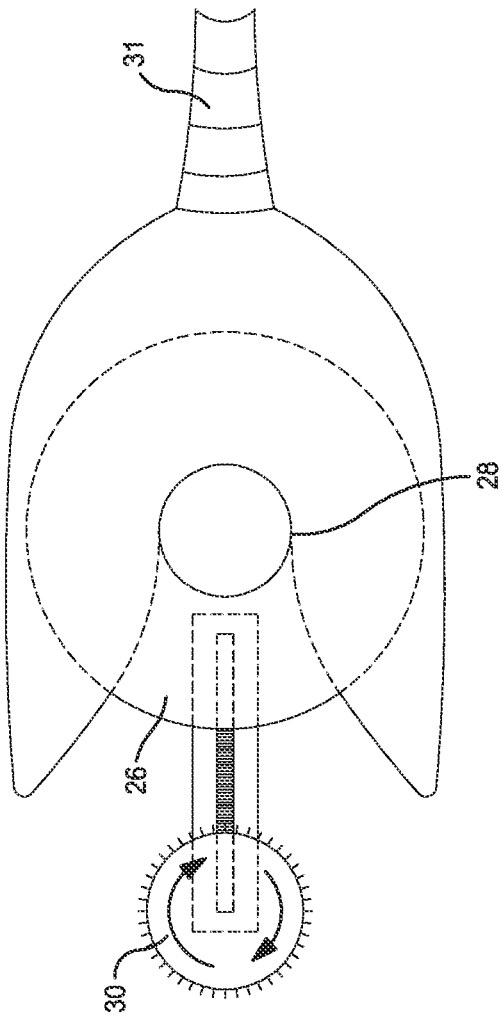
FIG. 8a
FIG. 8b

Certificate of Destruction — 96

Company receiving the service.

Name of Person authorizing the destruction process.

Company personnel witnessing the destruction process.

The tima and date of the destruction.

Name of the technician performing the process.

Running count of sub-components collected.

Running count of sub-components and their respective weights.

Additional dismantling demographic variables as needed.

Manufacturer's barcodes with corresponding corporate asset tags.

```
----------------------    ----------------------    ----------------------
----------------------    ----------------------    ----------------------
----------------------    ----------------------    ----------------------
----------------------    ----------------------    ----------------------
```

Retrieved QR and Data Matrix Code information:

```
------------------------------------------------------------------------
------------------------------------------------------------------------
------------------------------------------------------------------------
------------------------------------------------------------------------
------------------------------------------------------------------------
```

Certificate can be printed immediately or saved to a Word document or converted to a PDF that can be stored for future use or delivered electronically to another computer, smartphone or tablet.

FIG. 19

MANAGEMENT SYSTEM FOR HARD DRIVE DISMANTLING SYSTEM

CROSS-REFERENCE TO RELATED APPLICATIONS

This application is a continuation-in-part of U.S. application Ser. No. 15/900,066 entitled "Hard Drive Non-Destructive Dismantling System" filed Feb. 20, 2018, which is a continuation-in-part of U.S. application Ser. No. 15/516,609, entitled Hard Drive Dismantling System, filed Apr. 3, 2017, which is a national phase application of PCT/US16/40812, entitled Hard Drive Dismantling System, filed Jul. 1, 2016, that claims the benefit of U.S. Provisional Application No. 62/188,055, entitled Hard Drive Dismantling System", filed Jul. 2, 2015, the disclosure of all applications being incorporated herein by reference in their entirety.

TECHNICAL FIELD

This application relates generally to a system for dismantling various components of a hard drive, and more particularly, to a system that will identify and extract selected components from hard drives, in a non-destructive manner, for the purpose of reuse. In addition, the system may be provided with the option to destroy the data containing portions of the hard drive, based on the desired outcome of the system's operator.

BACKGROUND

The traditional linear economy, where products are made, used, and then disposed, is shifting to a circular economy where products are kept in use for as long as possible, with the occasional help of replacement parts, to achieve the maximum amount of use. Then the product is harvested for reusable parts and materials at the end of its extended service life to be used toward new products.

Various components from 3.5 inch and 2.5 inch hard disk drives (HDDs), solid state drives (SSDs) and hybrid hard drives (HHDs) like circuit boards, actuators/control arms, spindle hubs, voice-coils, and their aluminum or metal hard drive casings/chassis are actively being harvested for reuse. The rare earth magnets that are primarily in HDDs as well as HHDs are also being harvested for reuse in new computers as well as being re-configured for other rare earth magnet applications. The current method of dismantling hard drives to harvest their components is predominantly done manually and to a lesser extent semi-automatically. The present embodiment performs the dismantling process in a fully automated process that allows for low labor costs and an increased rate of component recovery. The complete destruction of hard drives, provided by traditional methods, does not readily permit the recapture and/or reuse, of targeted components.

Current methods of physical electronic media destruction, hard drives, consist of bulk/macro shredding and puncturing processes to reduce the volumes into manageable levels for downstream processing. While attempting to address the destruction of information stored on the respective hard drives. The decision to destroy or not destroy the information stored on the hard drives is chiefly driven by data security protocols established by the various businesses, institutions, and organizations, which have been mandated by federal, state and international laws to safeguard their customers' personal information.

With the recent decrease in commodity pricing, the present embodiment will provide collectors, processors, recyclers and refurbishers the opportunity to realize a higher rate of return on commodities recovered from recycled hard drives and/or a higher rate of recovery on parts for reuse. While still being able to address the physical destruction of the information bearing sectors of all 3.5 inch and 2.5 inch HDD, SSD and HHD hard drives, based on the desired outcome of the system's operator.

It is thus desirable to have a process and apparatus, using micro dismantling and milling, for reclaiming the elements of the hard drive that contain components that can be reused along with the rare earth elements; and then destroying the data containing portion of the drive, based on the desired outcome of the system's operator.

An example of a hard drive dismantling device (that does not destroy components) is shown in pending U.S. Patent Application Serial No. PCT/US16/40812 entitled Hard Dismantling System, filed Jul. 1, 2016 by Clark; the disclosure of which is incorporated herein by reference in its entirety. An example of a hard drive data destroying device that does not destroy the entire hard drive is shown and described in U.S. Pat. No. 8,851,404 entitled Hard Drive Shredding Device, issued Oct. 7, 2014 by Clark et al., the disclosure of which is incorporated herein by reference in its entirety. Another example of such a hard drive data destroying device is shown in U.S. Pat. No. 9,440,313 entitled Hard Drive Data Destroying Device, issued on Sep. 13, 2016 by Clark et al., the disclosure of which is also incorporated herein by reference in its entirety.

It is also highly desirable to provide a management system for the foregoing dismantling system in order to automatically monitor in real time the devices processed by a dismantling system and to provide for the automatic transferring of payment from a customer to a processor. Such a management system may also automatically monitor in real time various operating parameters of the dismantling system. It is also highly desirable to provide a management system wherein rare earth components of the constituent materials of the dismantling system are identified.

SUMMARY

A management method is employed for a dismantling system for hard drives. The hard drives are each associated with a customer and have identification (ID) data. The method comprises employing the dismantling system to process a multiplicity of hard drives into constituent materials and automatically monitoring in real time the hard drives processed by the dismantling system. The method includes providing a transaction database of transaction terms between a processor and at least one customer. The method employs determining in real time a contract value of each processed hard drive using the transaction database in response to the monitoring and automatically transferring payment from a customer to a processor in accordance with the contract value and the transaction terms.

The management method also preferably comprises automatically generating a list of the constituent materials for the hard drives and generating values for the constituent materials. The management method preferably comprises compiling a market database of current values for hard drive components. In one embodiment, the method additionally comprises automatically monitoring in real time operating parameters of the dismantling system and terminating the operation of the dismantling system in response to the monitoring. The payment method may be a digital or a fiat currency. The management method further comprises scanning the ID data and processing the hard drives using the ID data. The management method also preferably comprises identifying rare earth components in the constituent materials.

According to one aspect of the disclosure, there is provided a system for the non-destructive dismantling of components of electronic media storage devices such as hard disk drives, solid state drives and hybrid hard drives comprising: first devices to loosen various components of the storage device without destroying the components; second devices for dismantling the loosened components from the storage device without destroying the components, a database of information concerning past and current hard drives including their configurations, component locations and screw/fastener locations, a scanning system for retrieving information about the storage device being introduced into the system; and a holding chassis for receiving said storage device and moving the storage device in a position for engagement with said first and second devices, The scanned information and information from the database are used to control and position the first and second devices and holding chassis.

According to another aspect, there is provided a method for the non-destructive disassembly of electronic media electronic storage devices such as hard disk drives, solid state drives and hybrid hard drives by a system including stored information about the storage devices; mounting said storage device in a holding chassis; moving said holding chassis to introduce the storage device into the system; scanning information about the storage device being introduced into the system; loosening various components of the storage device by first devices without destroying the components or storage device; dismantling the loosened components from the storage device by second devices' without destroying the components or storage device and retrieving the components; and using the scanned information and stored data to position the devices and holding chassis.

According to a further aspect, there is provided a system for the non-destructive removal of the circuit board from the back of a hard drive comprising: a holding chassis for the hard drive for transporting the hard drive into the system; a fixture facing the circuit board of the hard drive when said hard drive is in the system, said fixture including at least one movable fastener removal unit and at least one suction unit; a database of information concerning the hard drive cover configurations and fastener locations; a scanning system for retrieving information about the hard drive being introduced into the system, said scanned information and said information from said database being used to control the fastener removal unit to remove the fasteners from the cover and said suction unit to remove the cover from the hard drive.

BRIEF DESCRIPTION OF THE DRAWINGS

FIG. 1a is a description of the operating system of a machine used for the non-destructive dismantling of hard drives and the destruction of the data containing portions if desired by the system's operator thereof;

FIG. 8a is a schematic side view of a system for milling the information containing platters of 3.5 inch HDDs and HHDs;

FIG. 8b is a schematic top view of the system of FIG. 8a;

FIG. 19 is an example of a Certificate of Destruction provided after the operation is complete;

DETAILED DESCRIPTION

In general, the system described herein can be used for non-destructive dismantling and extracting various components of electronic media storage devices such as HDD, SSD, and HHD hard drives. The HDD (Hard Disk Drive) hard drive is essentially a metal platter with a magnetic coating. The coating stores the data. A read/write head on an arm accesses the data while the platters are spinning in a hard drive enclosure. In SSD (Solid State Drive) hard drives, instead of the magnetic coating on top of platters, the data is stored on NAND flash memory (information pods). The SSD drive has no moving parts. The HHD (Hybrid Hard Drive) hard drive is a hybrid incorporating the HDD and the SSD principles.

Figure 1:
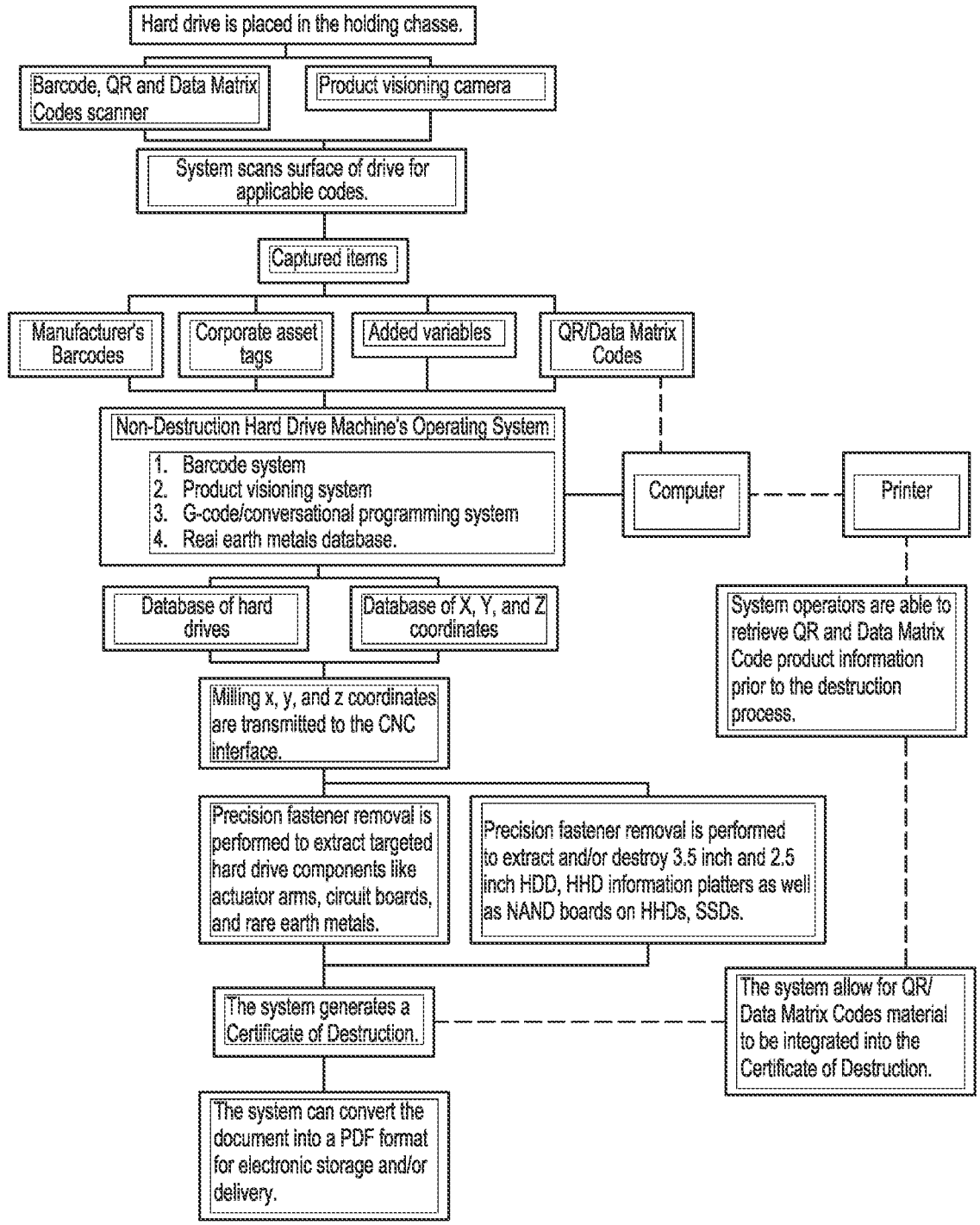
FIG. 1 is flow chart of the operation of the system.
Figure 2A:
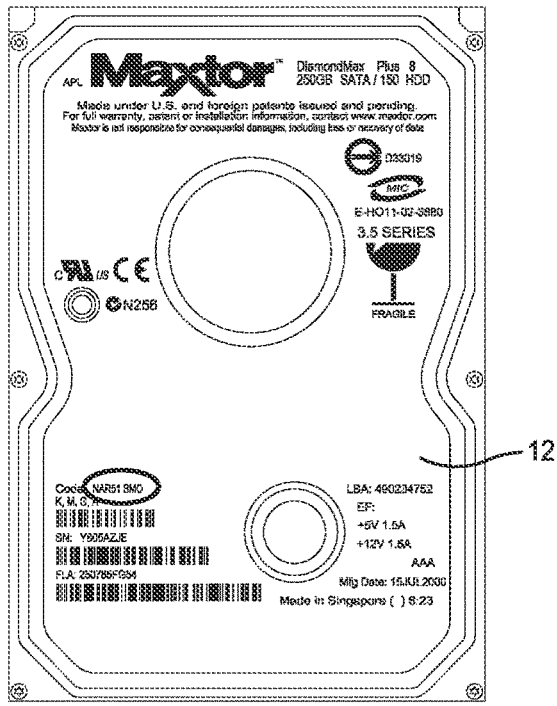
FIGS. 2a-2d are views of various components of a hard drive that may be desired to be recovered from the non-destructive dismantling process.
Figure 2B:
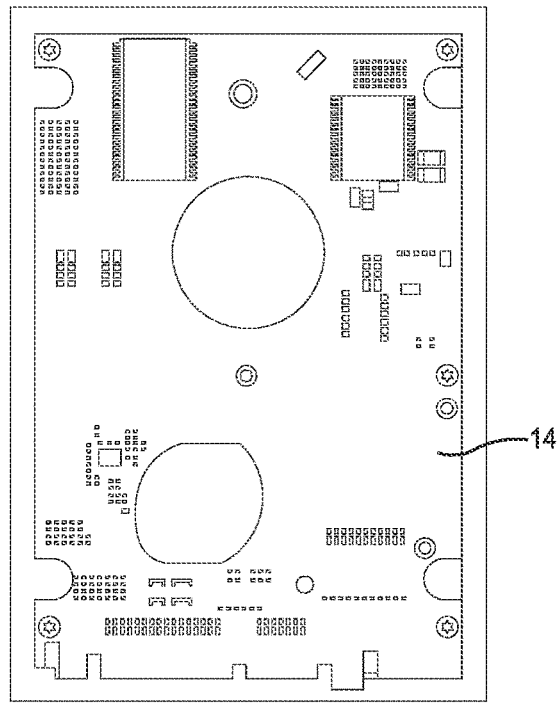
Figure 2C:
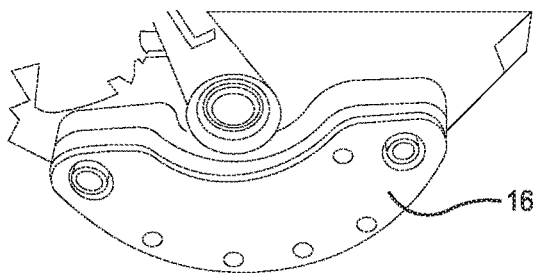
Figure 2D:
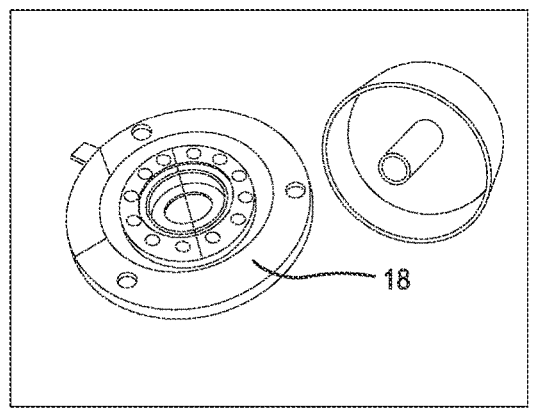
Figure 3:
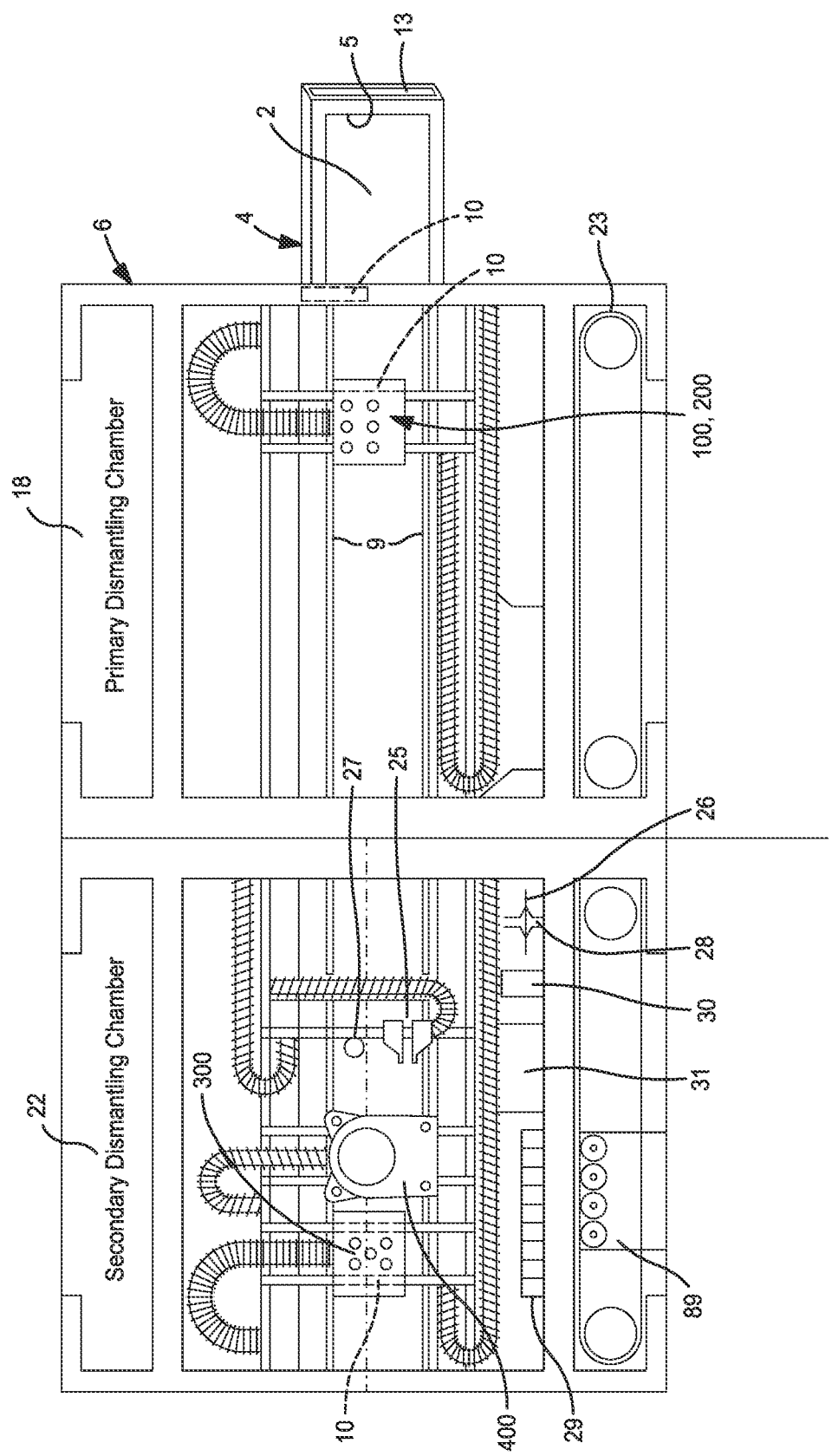
FIG. 3 is a schematic side view of a machine used for the non-destructive dismantling of hard drives and the destruction of the data containing portions if desired by the system's operator thereof.
Figure 4:
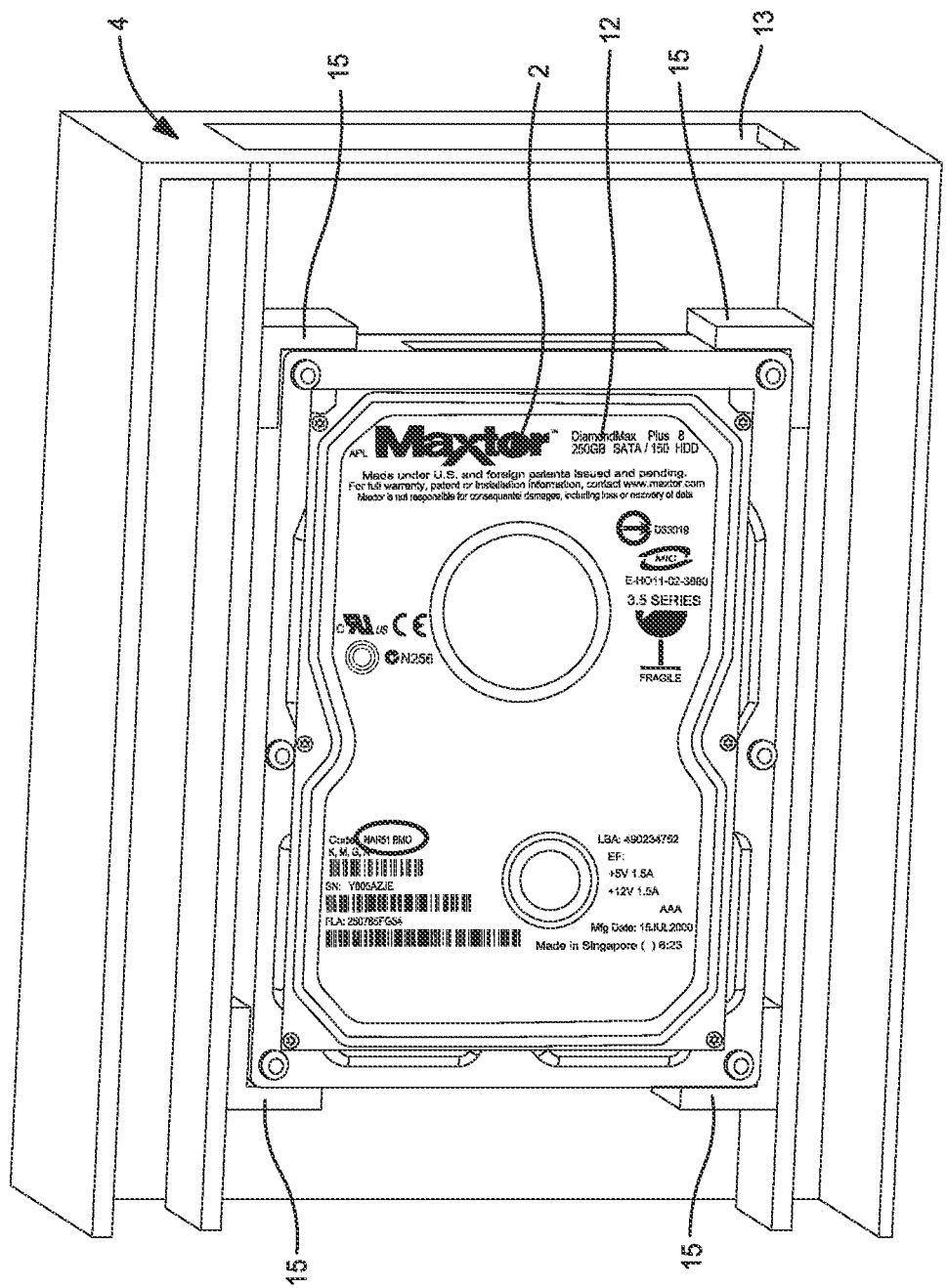
FIG. 4 is an isometric view of the loading chassis of the machine of FIG. 3 with a hard drive positioned therein.

As outlined by the flowchart shown in FIG. 1, the non-destructive dismantling process of a hard drive 2 is initiated when it is placed into the opening 13 of a vertical holding chassis 4 of the non-destructive dismantling machine 6 shown in FIG. 3. Then, the drive 2 is automatically indexed into the machine's screw/fastener removal chamber 8, by way of the hard drive transport rails 9, where a scanning system 10 scans the hard drive. The scanning system 10 includes a code reader that scans the top surface or cover 12 (See FIG. 4) of the drive 2 for its manufacturer's barcode and other appropriate indicators, which are used to identify the make and model of the hard drive. The scanning system 10 also includes a product visioning camera or integrated smart camera that will simultaneously scan the hard drive to aid in drive orientation and component recognition. A G-code or conversational programming database will also be a part of the non-destructive dismantling machine's product recognition operating system. During the initial scanning of the hard drive, the system will also have the capacity to read QR and Data Matrix Codes. The information retrieved may consist of a link to the manufacturers' or supporting companies' website and provide text content like the location make and model of the respective drives' circuit board along with recovery instructions. The operating system of the non-destructive dismantling machine 6 can print the retrieved information prior to beginning or upon completion of the non-destructive dismantling process. The operating system of the non-destructive dismantling machine also has the capacity to save the retrieved information as a Word document or convert it to a PDF that can be stored for future use or delivered electronically to another computer, smartphone or tablet.

When the manufacturers' barcode on the hard drive 2 is successfully captured, the non-destructive dismantling machine queries its barcode database, which consists of information about all hard drives, 3.5 inch and 2.5 inch HDDs, SSDs, and HHDs that are currently or were formerly available on the market. The system will also accommodate the integration of newly developed memory drives that are produced in the future. The system's barcode database will also interface with a visioning system comprised of a pictorial database cataloging specific components of the various types of drives, which will consist of: a) the manufacturer's barcode on the face cover 12 and top head of the drive; b) circuit boards 14 as well as the orientation of the rare earth metals, which consist of c) the voice-coil magnet 16 and d) the spindle motor 18 (See FIGS. 2a, 2b, 2c and 2d). The orientation of the hard drive cover 12, circuit boards 14, voice-coil magnets 16, and spindle motors 18 will also be accompanied with specific x, y, and z numerical coordinates with the visioning system to aid in their designated extraction procedure. Additional logistic information can be integrated into the system's database for the removal of other desired components. Based on the type of drive identified in the holding chassis, the program will convey specific non-destructive dismantling coordinates to the CNC interface, which consist of several non-destructive dismantling stages that start from the outside of the hard drive to the inside.

The present device also includes an operating system, as outlined in FIG. 1a, that integrates the following but, it has the capacity to be configured into one integrated system or expanded to more than the four systems currently presented. Further, the algorithm of the present embodiment's operating system has the capacity to be integrated, in part or in total, into other manufacturers' systems that are currently being developed or developed in the future:

1). A barcode reader system that has a database of all the manufacturers' barcodes for all the 3.5 inch and 2.5 inch HDDs, SSDs, and HHDs that are currently or were formerly available in the market. The manufacturers' barcodes that are captured with the reader will help the overall system determine the specific type of hard drive placed in the holding chassis, either a 3.5 inch or 2.5 inch HDD, SSD, or HHD, which will be conveyed to the product visioning database and G-code or conversational programming database to aid in the selection of the appropriate non-destructive dismantling sequence to perform on the respective drive. The barcode reading system will have the capacity to capture corporate asset tags placed on the hard drives and couple them with their corresponding manufactures' barcode. The barcode reading system will also have the capacity to read QR and Data Matrix Codes that are directly applied by the manufacturer or third-party source like a governmental agency, public/private corporation or organization. The information retrieved may consist of a link to the manufacturer's or supporting company's website. The code may also provide text content like the make and model of the respective drive's; specs on the drives' circuit board along with recovery instructions. When the QR and Data Matrix Codes of an HDD or HHD drive are scanned by the code reader 10 shown in FIG. 3, it can also provide the location of the drives' rare earth metals; specific non-destructive dismantling instructions, shipping instructions to appropriate processing facilities, and current commodity as well as non-commodity pricing. Additionally, the system will be able to produce a Certificate of Destruction to inventory the drives that were dismantled. The Certificate can be printed, converted to a PDF to be electronically stored or transmitted.

2). A product visioning system with a database comprised of all the 3.5 inch and 2.5 inch HDDs, SSDs, and HHDs that are currently or were formerly available in the market. Each hard drive in the database will have images of their targeted components primarily consisting of: a) the hard drive cover 12, mainly for added product recognition and product orientation within the primary dismantling chamber; b) circuit boards 14, c) voice-coil magnets 16, and d) spindle coil 18. The captured images will have corresponding numerical x, y, and z numerical coordinates to aid in the extraction of their targeted components. The product visioning database will also have the capacity to integrate images of other desired components to extract from the drive.

3). A G-code or conversational programming system with a database, of all the 3.5 inch and 2.5 inch HDDs, SSDs, and HHDs that are currently or were formerly available in the market, will house the pictorial images of the respective drives' configuration from their exterior to interior including the targeted components shown in FIGS. 2a-2d. Corresponding tool path coordinates will accompany the images to guide the systematic non-destructive dismantling/removal of components from the hard drive from their exterior to interior. Each of the operating system's databases will have the capacity to integrate information from newly developed memory drives that are produced in the future.

4). The present device also includes a database, which is comprised of a pictorial database of the rare earth metals and their corresponding x, y, and z numerical coordinates on all 3.5 inch and 2.5 inch HDDs and HHDs that are currently or formerly available on the market. The database has the capacity to integrate newly developed memory drives, containing rare earth metals that are produced in the future.

Figure 3A:
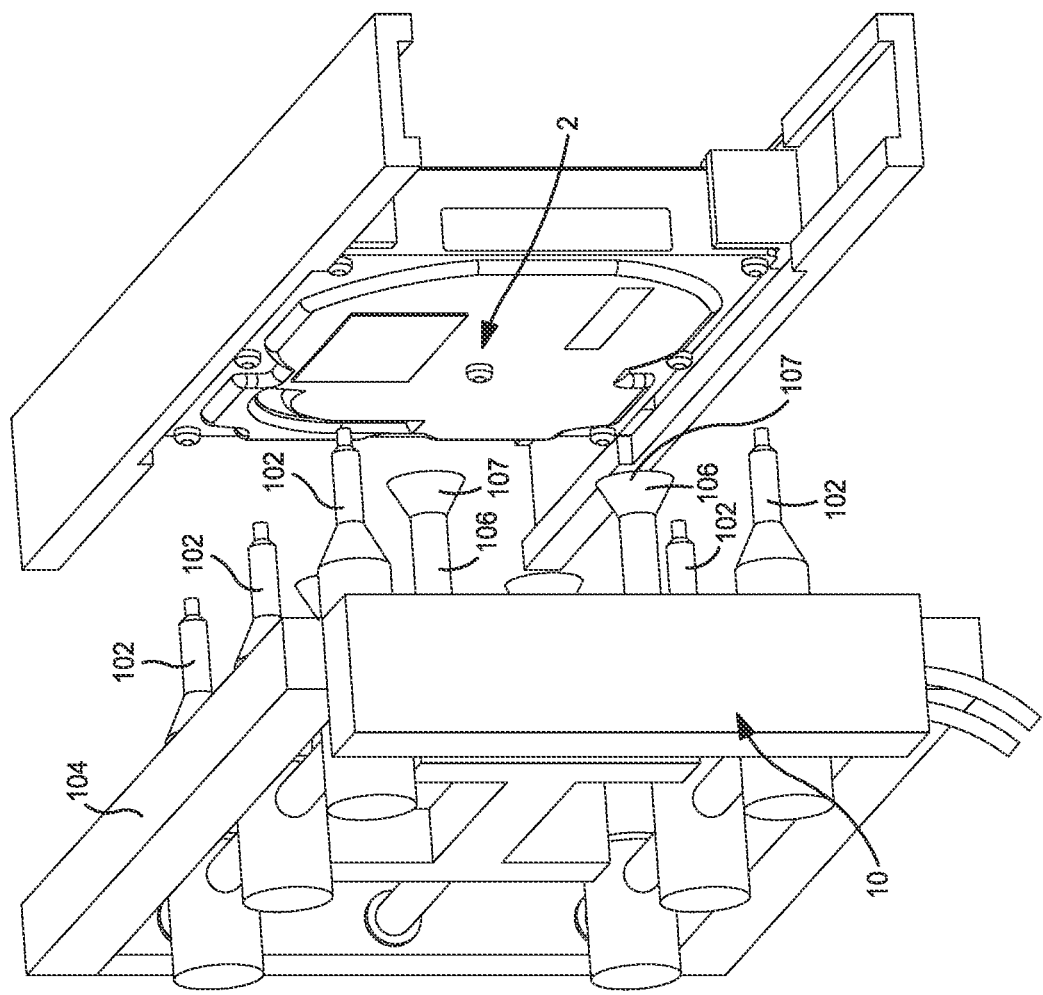
FIG. 3a is a perspective side view of the integrated front large six-unit hybrid non-destructive dismantling and suction fixture.

As shown in FIG. 3, the primary dismantling chamber 8 of the present machine 6 includes a vertically positioned large front hybrid non-destructive dismantling and suction fixture 100. As shown in FIG. 3a, the fixture 100 includes a frame 104 having six adjustably mounted screw/fastener removal units 102 and six adjustably mounted suction units 106 positioned over the front of the hard drive 2. The screw/fastener removal units 102 may be automated screw drivers, pneumatically or electrically driven or any other device capable of automatically removing the screws with damaging surrounding material and preferably the screws themselves. Each suction unit 106 is attached to a vacuum source (not shown) and is provided with an intake nozzle 107. The screw/fastener removal units 102 are movable to properly align with a fastener in the hard drive. The suction units 106 are also moveable.

Figure 3B:
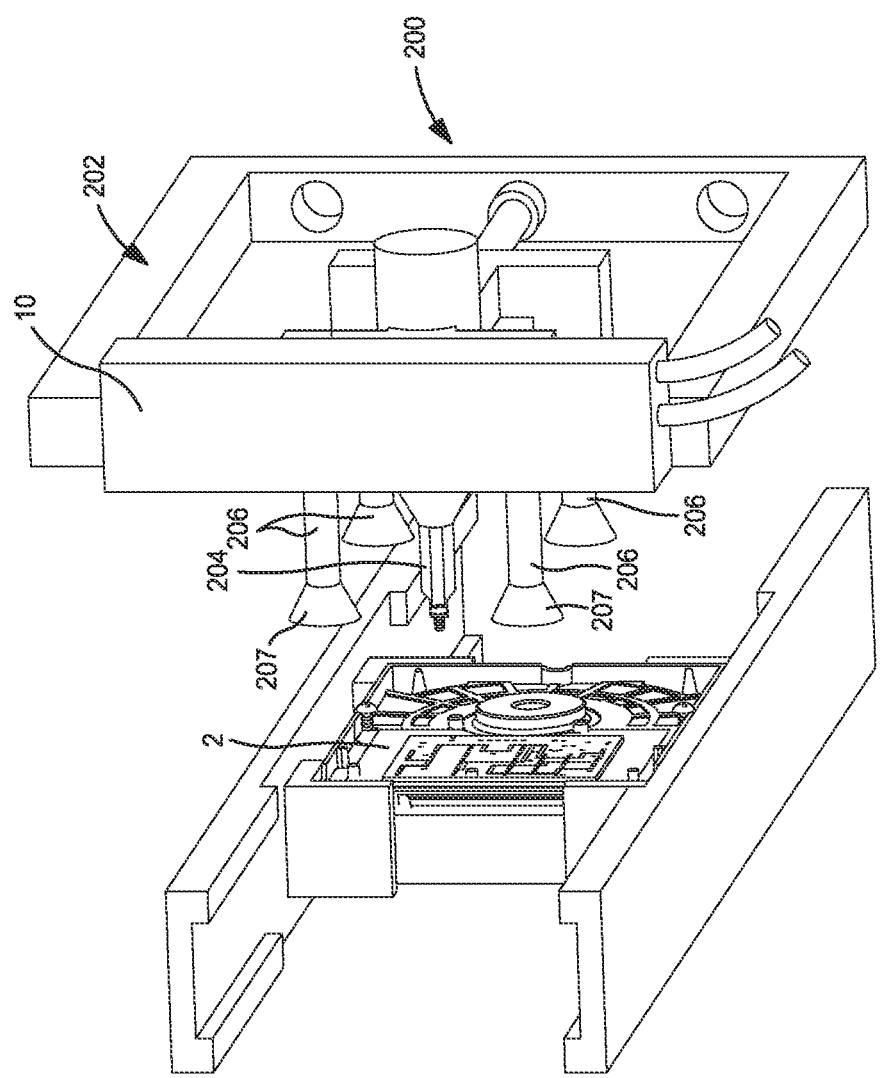
FIG. 3b is a perspective side view of the integrated back small non-destructive dismantling and suction fixture.

The machine 6 also includes a back small hybrid non-destructive dismantling and suction fixture 200, shown in FIG. 3b, that includes a frame 202 having one adjustably mounted screw/fastener removal unit 204 integrated with four suction units 206 including intake nozzles 207, positioned over the back of the hard drive 2. The back small hybrid non-destructive dismantling and suction fixture 200 is co-located with the large front hybrid non-destructive dismantling and suction fixture 100 in the primary dismantling chamber 8, and is directly behind the non-destructive dismantling and suction fixture 100 as view in FIG. 3.

Figure 3C:
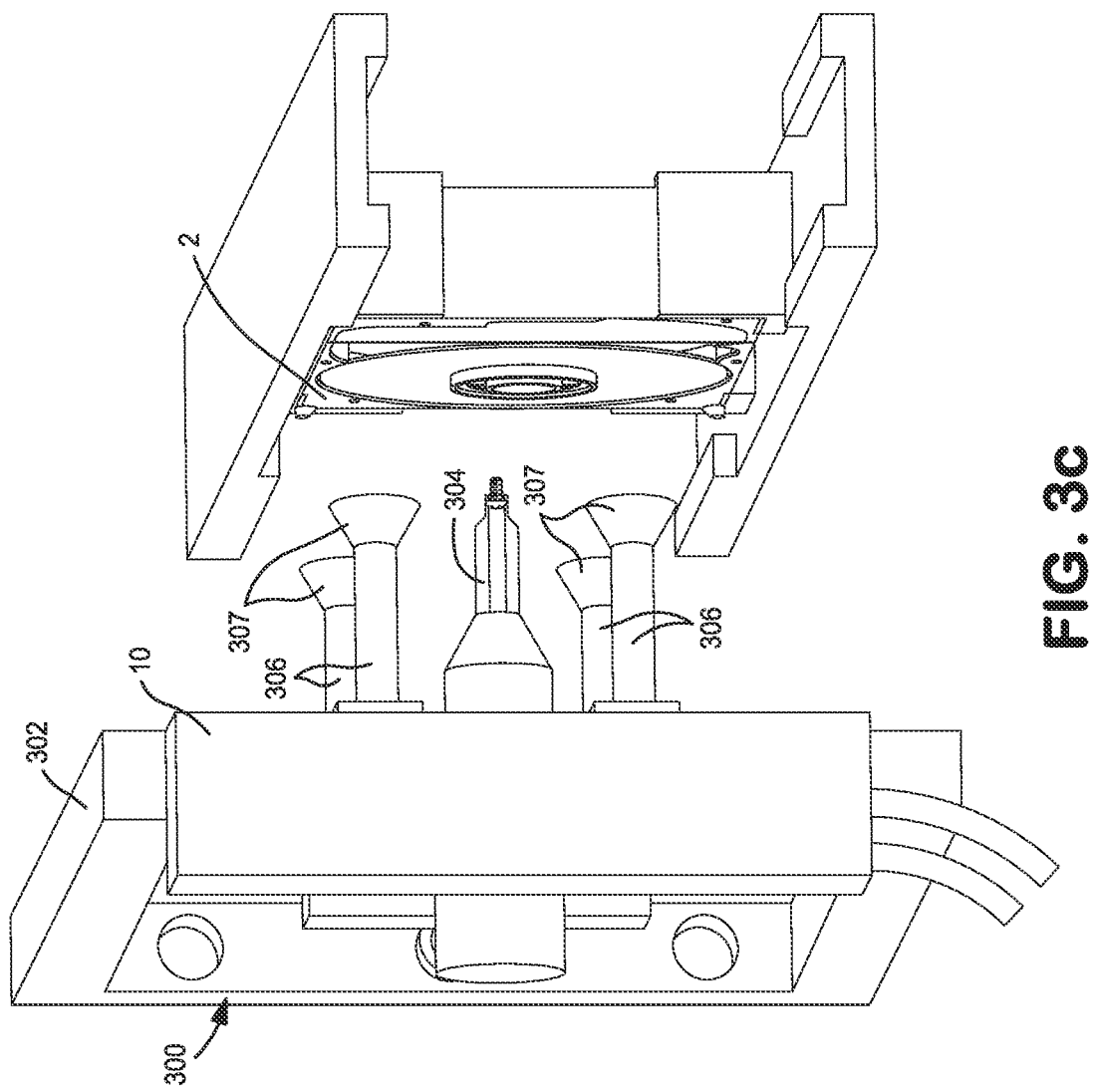
FIG. 3c is a perspective side view of the integrated front small non-destructive dismantling and suction fixture.

The machine's secondary dismantling chamber 22 is provided with a front small hybrid non-destructive dismantling and suction fixture 300 shown in FIG. 3c, positioned over the front of the drive 2, to further contribute to the machine's non-destructive dismantling of HDDs, SSDs and/or HHDs. This fixture includes a frame 302 having one adjustably mounted screw/fastener removal unit 304 integrated with four adjustable suction units 306 with intake nozzles 307.

In the case of each of the fixtures 100, 200, 300, the combined elements of the screw/fastener removal tools and the suction units work simultaneously to extract the fastening screws and remove the designated components from the hard drive's chassis in a rapid sequential process. The screw/fastener removal units 204 and 206 and suction units 206 and 306 of the back small hybrid non-destructive dismantling and suction fixture 200 and front small hybrid non-destructive dismantling and suction fixture 300 respectively are the same as the units in the large front hybrid non-destructive dismantling and suction fixture 100.

Hard drives are typically configured with the same outer dimensions, which allows for the collection of plotted points in a database, directing the described large and small hybrid non-destructive dismantling and suction fixtures where to remove the screws/fasteners of targeted components.

In operation, once the hard drive 2 is placed in the holding chassis 4, the system's barcode reader scans and retrieves specific information unique to the hard drive. The first stage of the non-destructive dismantling process consists of the system's database conveying the captured information, about the hard drive 2, to the front large hybrid non-destructive dismantling and suction fixture 100 that proceeds to align the individual screw/fastener removal units 102 of the six-unit hybrid milling non-destructive dismantling and suction fixture 100 over the screws/fasteners around the perimeter of the hard drive cover 12. The optic/visioning sensors of the scanning system 10, integrated with the six-unit non-destructive dismantling and suction fixture 100, provides additional assistance locating and extracting the targeted screws/fasteners.

When the perimeter screws/fasteners have been removed, a single screw/fastener removal tool 102 and suction unit 106 of the front large six-unit hybrid non-destructive dismantling and suction fixture 100, is designated as the alpha-unit, providing the solo screw/fixture and component removal of the screws in the central portion of the hard drive cover 2. The rest of the screw/fixture removal units 102 and suction units 106 stay dormant, but they can be programmed by the system's G-code/conversational programming database to assist in the screw/fastener removal process. The corresponding suction units 106 of the large six-unit hybrid fixture 100 index toward the surface of the hard drive cover, applying (surface) tension during the screw/fastener extraction process; and then activate the suctioning for removal of the drive's cover.

Simultaneously on the back of the hard drive, the small hybrid non-destructive dismantling and suction fixture 200 is directed to remove the fastening screws from targeted components on the back of the hard drive 2 that are listed in machine's operating system, The dismantling process will simultaneously continue on both front and back of the hard drive, starting from the outside to the inside, until the screws/fasteners of the targeted components are removed from the hard drive chassis. The targeted components that are removed will be placed in their respective containers as further described below or they can be collected on a conveyor belt 23 for further downstream automated or manual processing.

The machine 6 may be equipped with means to destroy the information bearing material of the hard drive as described in detail below. In cases of machines so equipped, the machine is programed so the information bearing material, platters and/or NAND circuit boards, are destroyed using the methods and mechanisms described below or programmed to be kept whole based on the desired outcome of the system's operator.

The hybrid non-destructive dismantling and suction fixtures, featured in this present embodiment, not only expedite the removal of the hard drive cover and other targeted components, but the machine's large six-unit hybrid fixture 100 as well as the front and back small hybrid fixtures 200 and 300 also contribute to the direct placement of the harvested components to their respective collection/processing points. Along with the type of drives stored in the program's database are the drives' corresponding x, y, and z numerical coordinates, which will be interfaced with a database consisting of specific G-codes or conversational programming used to direct the path of the automatic screw drivers in removing the screws/fasteners, on the drives without damaging the screws; targeted components or threaded holes where the screws were fastened.

The present process allows the screws to be reused. However, to expedite the screw removal process, the present process can also accommodate interchangeable screw removal fixtures that bore/core into the heads of the targeted screws. Then the screws are turned in a counter-clockwise manner extracting the whole screw from their fastened positions. Although the screws cannot be reused, the threaded holes, where the screws were fastened, and the targeted components that have been unfastened remain intact for reuse when new screws are used to refasten the components. It should be mentioned that to further expedite the dismantling of the hard drive, without being able to reuse the screws and a majority of the connected components, the system's operator may choose an interchangeable boring/coring tool to extract the targeted components for recycling purposes rather than for reuse.

The non-destructive dismantling process will be conducted on both sides of the hard drive, at the same time. The following stages provide explanation for the non-destructive dismantling of HDDs (it should be further noted that the dismantling process may vary based on the make and model of hard drives):

Prior to processing hard drives, all external hardware like mounting clips as well as plastic and metal casing need to be removed. The hard drive 2 will be placed, on its edge, in the vertical holding chassis 4 having an open center 5. There are two distinct holding chassis; one for 3.5 inch drives and the other for 2.5 inch drives. When the hard drive 2 is introduced to its appropriate holding chassis through the opening 13, it will automatically index into the primary dismantling chamber 8, along the hard drive transport rails 9. Holding clips 15 in the perimeter of the holding chassis 4 will secure the hard drive 2 in place during the non-destructive dismantling process. Both the barcode scanner and visioning camera of the scanning system 10 will proceed to scan the drive. The present machine will also be able to process hard drives that have their covers removed and the information platters milled out. These particular hard drives will be identified by the manufacturer's barcode placed on the top edge of the hard drive.

Stage 1 (Front): Once the hard drive 2 has been identified, additional coordinates received from the visioning sensors are transmitted to the system's CNC interface directing the speed, depth and positioning of the automatic screw drivers, system's databases and transmit it to the six-unit hybrid non-destructive dismantling and suction fixture 100, to remove the targeted screws/fasteners from the perimeter of the hard drive cover 14. As mentioned above, a single screw/fastener removal unit 102 and suctioning unit 106, from the front six-unit hybrid non-destructive dismantling and suction fixture 100, will be designated as the alpha-units, providing the solo screw/fixture and component removal of the screws in the interior portion of the hard drive cover 14. The rest of the screw/fixture removal units 102 and suction units 106 will stay dormant, but they can be programmed to assist in the screw/fastener removal process. On specific hard drives, a wedging mechanism (not shown) will be inserted along the outer edge of the drive's cover to help break the adhesive seal.

Stage 1 (Back): At the same time, the smaller hybrid non-destructive dismantling and suction fixture 200 is positioned over the backside of the hard drive 2 and will receive coordinates from the system's databases to remove screws that are holding the drive's circuit board in place. The screw/fastener removal unit 202 and suction units 206 removes the screws.

The integrated motion of the present system's hybrid non-destructive dismantling and suction fixtures, front 100 and back 200, consist of a sequential process where the targeted screws/fasteners are removed fallowed by the suction system extracting the first series of targeted components (hard drive cover and circuit board). The targeted components are released onto the system's conveyor belt 23 below the primary dismantling chamber 8. The conveyor belt 23 runs the full length of the non-destructive dismantling system to capture all the dismantled and falling parts. Then the conveyor belt 23 transports the collected components downstream for further automated or manual processing to occur. The described embodiment can be adapted with cooling nozzles that emit air, $CO_2$, $LN_2$, or micro lubricants in the form of a mist directly on the screws/fasteners of the targeted components or through holes in the screw/fastener removal tools for better performance and extended wear (not shown). The described non-destructive dismantling system can also be programmed to recover other desired components inside the hard drive.

Figure 5:
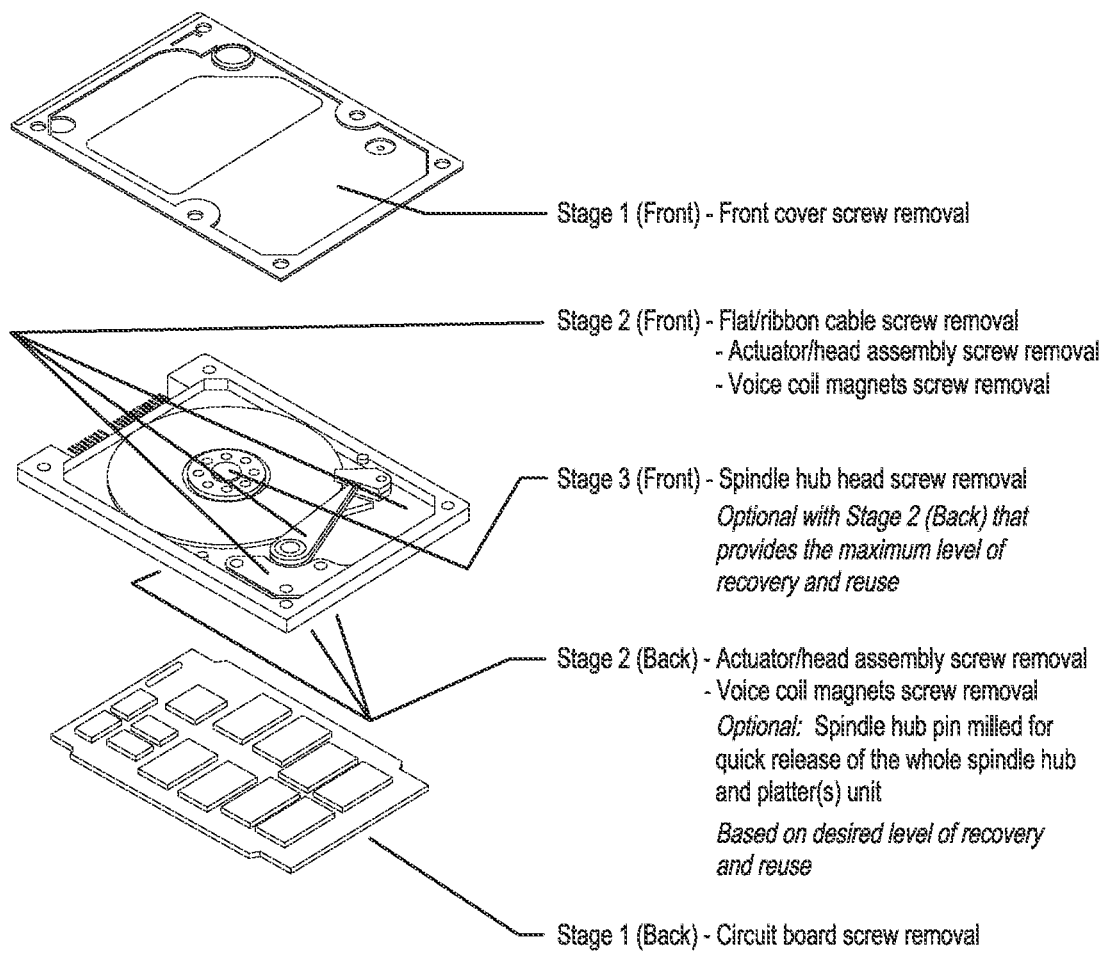
FIG. 5 is a showing of the non-destructive dismantling sequence for 3.5 inch and 2.5 inch hard disc drives (HDDs)
Figure 6:
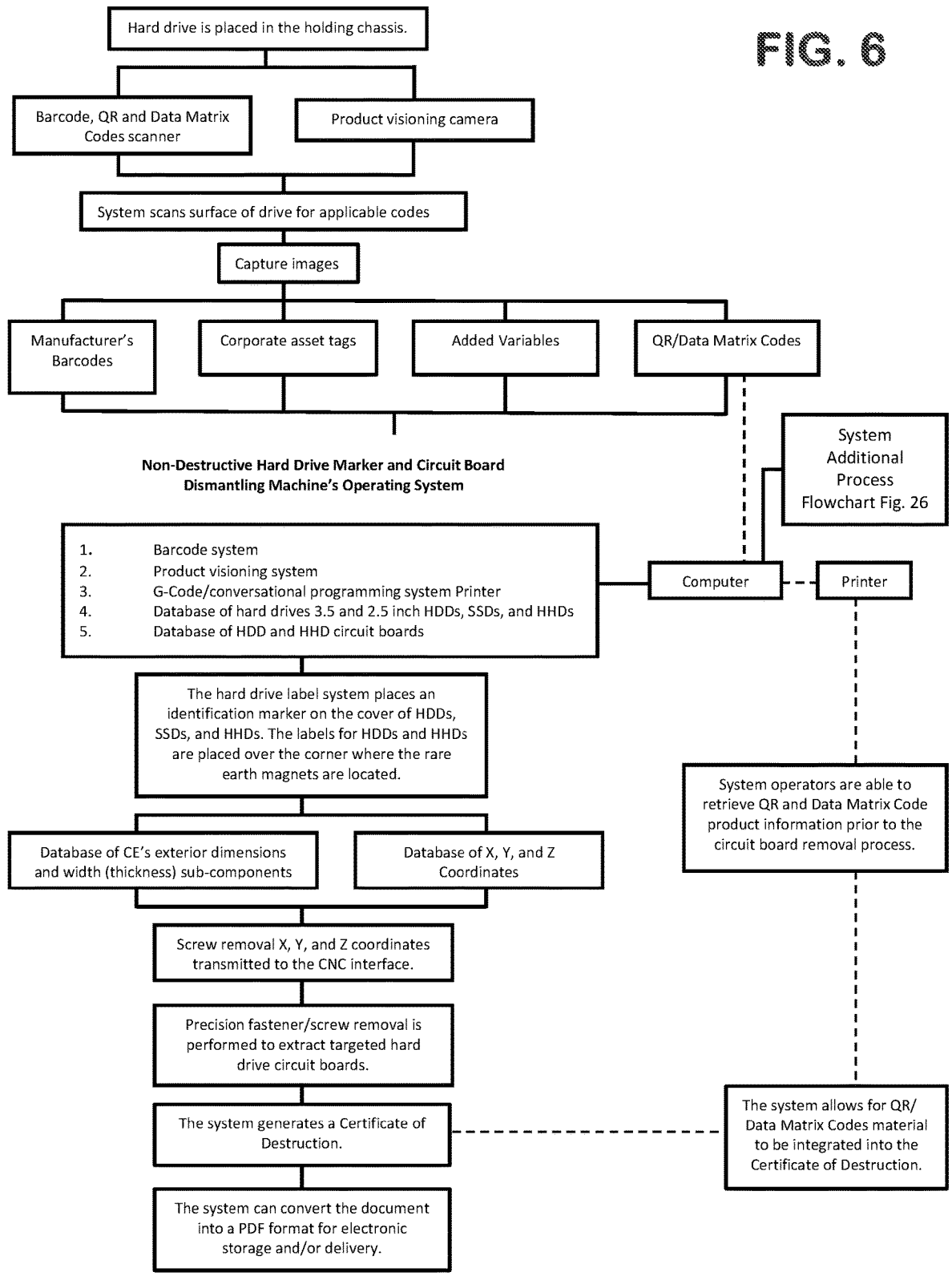
FIG. 6 is a showing of the non-destructive dismantling sequence for 3.5 inch and 2.5 inch solid state drives (SSDs)
Figure 7:
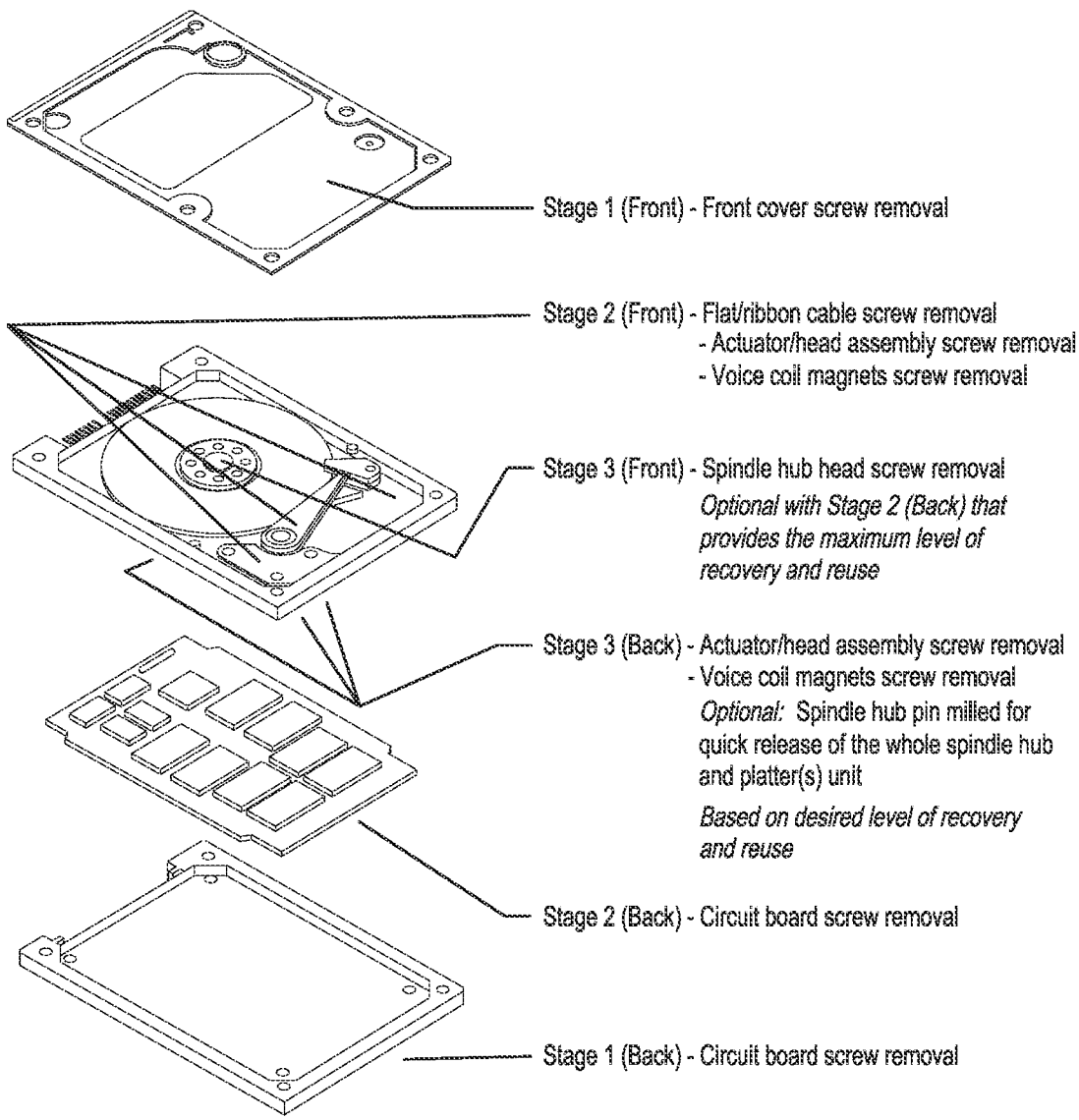
FIG. 7 is a showing of the non-destructive dismantling sequence for 3.5 inch and 2.5 inch hybrid hard drives (HHDs)

FIGS. 5-7 show the non-destructive dismantling sequence of the various hard drives (HDD, SSD, and HHD). The dismantling process may vary based on make and model of hard drives.

Stage 2 (Front): The hard drives are then indexed into the secondary dismantling chamber 22 with their covers and circuit boards removed. If the system's operator desires to reuse the hard drives' control arms, then HDDs and HHDs are scanned with the system's visioning camera to determine if the drives' control arms are in the park position. If the control arm is not in the park position, the screw/fastening tool unit 302 of the small hybrid non-destructive dismantling fixture 300 is exchanged with an adaptive tool (not shown) that will turn the spindle hub in a counter-clockwise direction to return the control arm to its park position. The procedure helps lessen the chance of damage to the control arm prior to commencing the targeted removal of components in Stage 2 (Front).

Once this has been achieved, logistic coordinates from the system's databases again direct the front small hybrid non-destructive dismantling and suction fixture 300 over the front of the hard drive, to remove the targeted screws/fasteners that are holding the flat cable, head assembly, and voice-coil magnets in place. If the front small hybrid non-destructive solo screw/fixture and component removal process, in Stage 2 (Front), did not completely extract the targeted items, the secondary dismantling chamber 22, utilizes a more aggressive method for removing components, like the voice-coil magnets, using a clamping mechanism 25 or magnetic mechanism 27 The recovered voice-coil magnets 16 are then dropped into a separate holding bins in a container 29 that prevent the magnets' magnetism from interacting with the other magnets that have been collected.

While the back small hybrid non-destructive dismantling and suction fixture 200 is over the back of the hard drive receives coordinates from the system's databases, to remove targeted screws/fasteners holding the head assembly as well as additional rear mounted screw/fasteners associated with the voice coil magnets 16. The present system has the capacity to automatically exchange tool bits on one or all of the screw/fastener removal units with boring/coring or other adaptive tool bits for a more precise extraction on both the front and back small hybrid non-destructive dismantling and suction fixtures 200, 300 as well as the large six-unit hybrid non-destructive dismantling and suction fixture 100. The procedure for removing the rear fastening screws, of the head assembly and voice-coil magnet 16, can also be performed during Stage 1 (Back) when the circuit board is being removed, by boring/coring out targeted screws/fasteners through the circuit board where the rear fastening screws are located. The present assembly of the back hybrid non-destructive dismantling and suction fixture 200 can be exchanged with an optional single milling tool bit to bore/core out the targeted screws. However, this step should be bypassed if it is the intention of the system's operator to reuse the circuit board rather than expedite the removal of the assembly head and/or voice-coil magnets assembly. The optional milling tool in the back small hybrid non-destructive dismantling and suction fixture 200 can also be directed to bore/core out a hole in the rear assembly of 3.5 inch and 2.5 inch HDD and HHD spindle hubs, which will expedite the release of the whole spindle hub unit including the platters as early as Stage 1 of the hard drive dismantling process. However, this step should be bypassed if it is the intention of the system's operator to not only reuse the spindle hubs and the information bearing platters, but the circuit boards, and NAND flash memory cards in HHDs.

When Stage 2 (Front and Back) of the screw/fastener removal process is complete, the vertical hard drive holding chassis remains in the secondary chamber 22 for the next stage of dismantling. Stage 3 (Front): If the front small hybrid non-destructive dismantling and suction fixture 200 did not completely extract the targeted items, in Stage 2 (Front) the secondary dismantling chamber 22, utilizes a more aggressive method for removing components, like the voice-coil magnets, using a clamping mechanism 25 or magnetic mechanism 27. The recovered voice-coil magnets 16 are then dropped into separate bins in the holding container 29 that prevent the magnets' magnetism from interacting with the other magnets that have been collected.

Figure 3D:
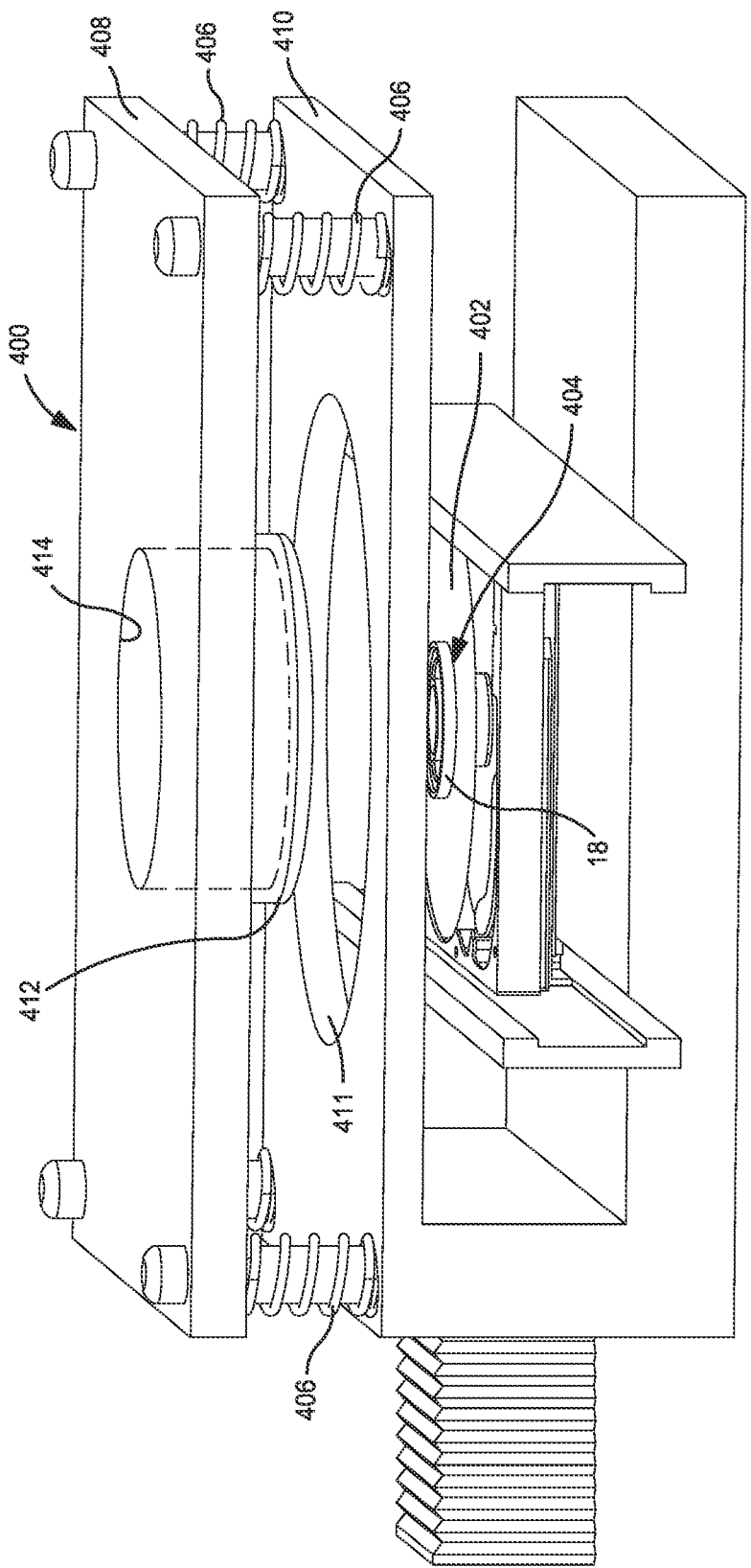
FIG. 3d is a perspective view of the spindle clamp mechanism.

Stage 3 (Front): The screws from the hard drive's spindle hub are removed in the secondary dismantling chamber 22. A spring-loaded spindle hub clamping mechanism 400 shown in FIG. 3*d* guided by the machine's database, is automatically positioned over the top information platter 402 of open-faced HDDs and HHDs identified in the machine's holding chassis 4 to prevent the spindle platter hub unit 404 and attached platters 402 from rotating. This is accomplished by compressing the springs 406 between the top and bottom plates 408, 410 of the clamping mechanism 400, which proceeds to press a circular collar 412 attached to the top plate 408 through an aperture 411 in the bottom plate 410 and around the spindle hub 18 of the hard drive, and onto the surface of the top information platter 402. The circular collar 412 is made of a synthetic non-fibrous material to reduce the transfer of corrupting material like dust. Then the screw/fastener unit 302, of the front small hybrid non-destructive dismantling and suction fixture 300, indexes toward the head of spindle hub through a central bore 414 in the top plate 408 and collar 412 systematically removing the screws/fasteners under the direction of the system's database and visioning mechanism. When the screws/fasteners are removed from the head of the spindle hub unit 404, the spring-loaded spindle hub clamping mechanism 400 disengages from the hard drive.

The suction units 306 on the front small non-destructive dismantling system 300 act as a pick and place mechanism removing the information platters from the spindle hub unit 404. If the platters are not to be destroyed, the platters are placed on the conveyor belt 23 for collection and later processing.

If the machine is so configured so as to include the destruction of the platters, referring to FIGS. 8*a* and 8*b*, the platters 26 are then placed in a nesting clamp 28, which allow the platters to securely spin while a milling tool 30 grinds away the platters 26 from their outer edge to the inner portion. The nesting clamp 28 will also accommodate platters 26 from the 3.5 inch HDDs and HHDs that are still mounted to the spindle hub. The metal filings are collected with a vacuum system. The destruction of the platters occurs in an enclosed compartment of the machine 6 to preserve the integrity of the other collected components and/or the desire to conduct dismantling in a clean room environment.

The following are a series of alternate methods, for destroying the information bearing sectors, platters, of 3.5 inch HDDs and HHDs. However, this procedure can be bypassed if the system's operator desires to reuse the dismantled components of the information bearing sectors. Also, as described above the machine can be configured without any inclusive means to destroy the hard drive platters.

As shown in FIGS. 9-12*b*, the milling of the 3.5 inch platters can be performed with one or more milling tool configurations. In all cases, the information stored on the platters is destroyed.

Figure 9:
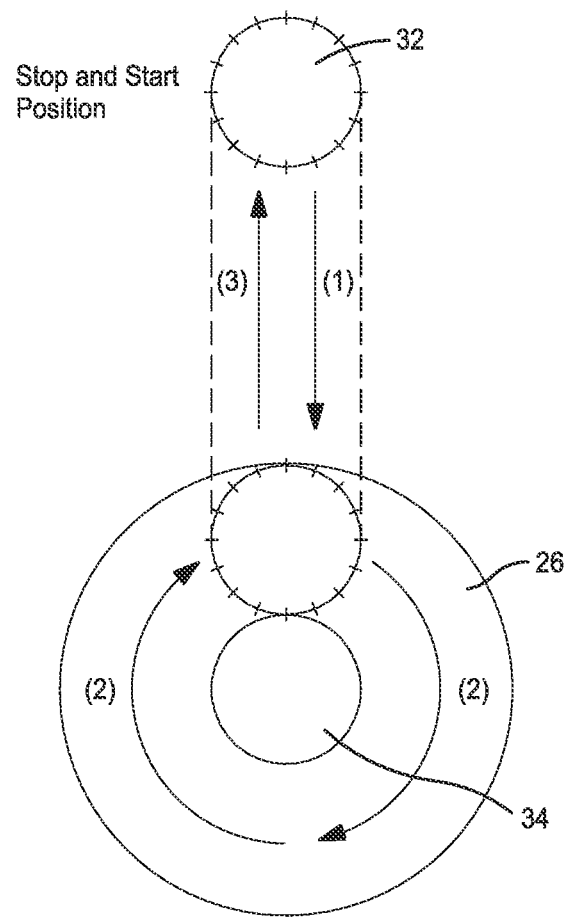
FIG. 9 is a schematic top view of an alternative method of milling the hard drive's information bearing sectors.

FIG. 9 shows schematically another method of shredding the platters 26. A single cutting tool 32 is mounted in a suitable mechanism that is guided in a track to move the cutting tool 32 toward the hub 34 of the platter 26. Once the rotating cutting blade of the cutting tool 32 pierces the outer portion of the platter and reaches the platter hub 34, moving along the path indicated by the arrows (1), the cutting tool 32 follows a clockwise 360-degree cutting track around the platter hub 34, indicated by arrows (2), shredding the hard drive platters 26 so that the only thing that remains of the hard drive platters 36 are small metal shavings.

Once the cutting tool 32 has completed the 360-degree cutting path around the hub 34, the cutting tool 32 returns to the start position along the path indicated by arrows (3).

Figure 10:
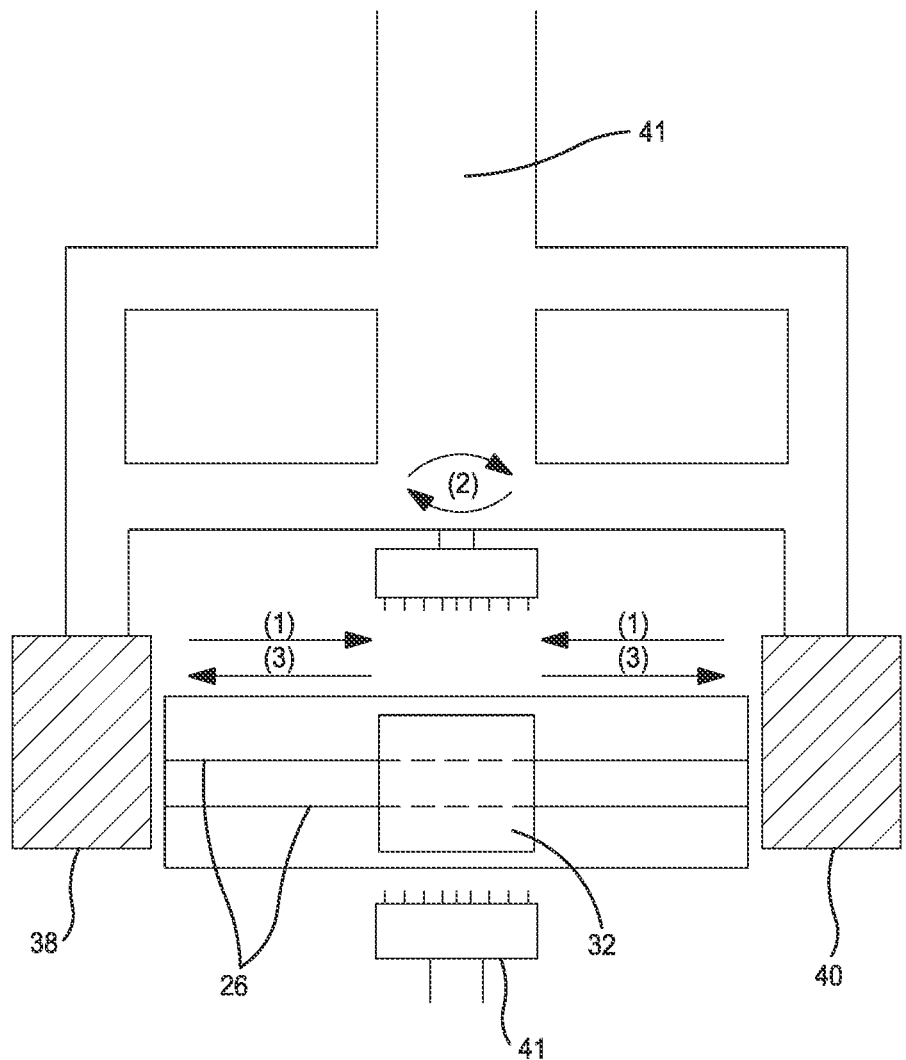
FIG. 10 is a schematic side view of another alternative method of milling the hard drive's information bearing sectors.
Figure 11:
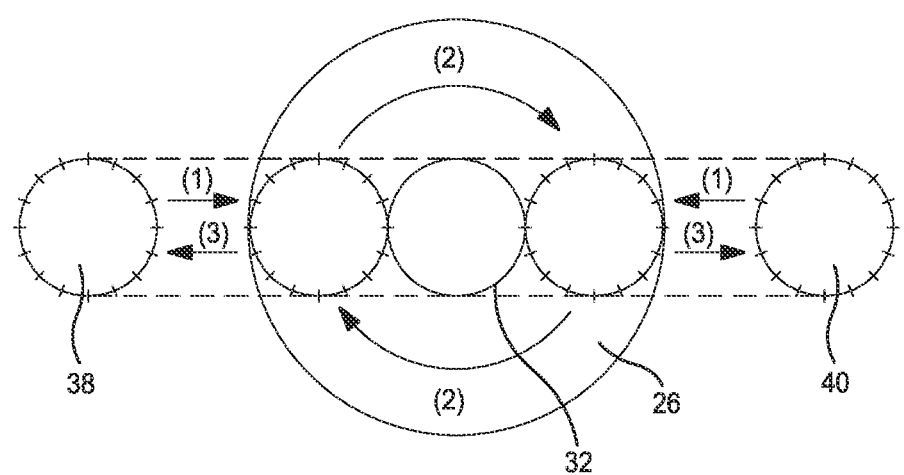
FIG. 11 is a schematic top view of the alternative method of milling the hard drive's information bearing sectors; shown in FIG. 10.

FIGS. 10 and 11 show schematically yet another method of shredding utilizing two cutting tools 38 and 40. As shown, the cutting tools 38 and 40 are mounted one to either side of the hard drive 30. The cutting tools 38 and 40 are mounted on suitable mechanisms 41 that can be moved in tracks to move each cutting tools 38 and 40 toward the hub 32 of the platters 26. A hard drive platter clam 41 clamps the platters 26 and prevents them from rotating. Once the rotating cutting blades of the cutting tools 38 and 40 pierce the outer portions of the platters 26 and reach the platter hub 34, the mechanism moves the cutting tools 38 and 40 around an axis extending through the center of the hub 32 as shown. The cutting tool 38 is moved clockwise from nine to three o'clock and the other cutting tool 40 is moved clockwise from three to nine o'clock around the platter hub 34 as indicated by the arrows (2) leaving only shavings.

Once the cutting tools 38 and 40 complete the 180 degree cutting path around the platter hub 34, the movement of the cutting tools 38 and 40 is reversed and the cutting tools 38 and 40 are returned to their original position.

Figure 12:
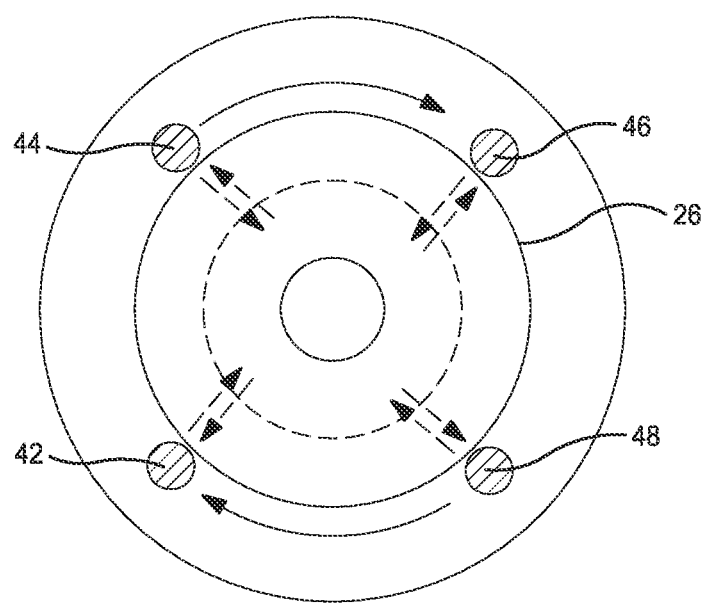
FIGS. 12 and 12a are schematic top and side views of yet another alternative method of milling the hard drive's information bearing sectors.
Figure 12A:
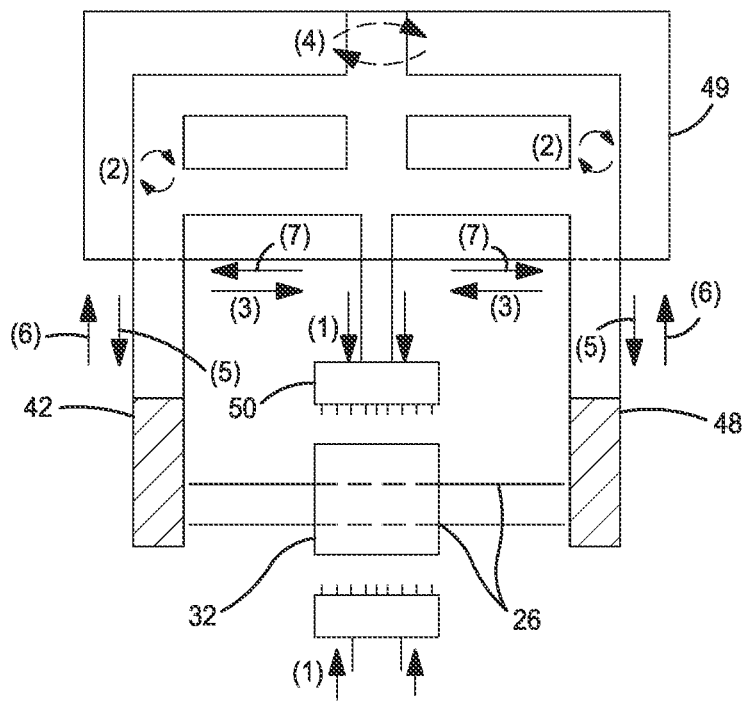

FIGS. 12*a* and 12*b* schematically represent another method of shredding platters 26. As shown, there are four milling tools 42, 44, 46 and 48 mounted around a circle having a diameter slightly greater than the outside diameter of the platters 26 and initially positioned above the platters 26. These milling tools 42, 44, 46 and 48 are shaped like a drill bit in that they have a side cutting edge 49 and use their sides 51 to grind away the platters 26. The milling tools 42, 44, 46 and 48 are mounted on suitable mechanisms 41 that can be moved in tracks to reciprocate each milling tools 42, 44, 46 and 48 vertically toward and away from the platters 26 and horizontally toward and away from the hub 32 of the platters 26.

In operation, a hardware drive platter clamp 50 clamps, applies pressure to, the hub of the hard drive 32 and each cutting tool is rotated about its axis as indicated by the arrows (2). The milling tools 42, 44, 46 and 48 are spun about their individual axes and lowered toward the platter 26 in the direction of arrows 5 until the lower ends of the milling tools 42, 44, 46 and 48 pass the platters 36 in the hard drive 30. The milling tools 42, 44, 46 and 48 are then rotated around the axis of the hub 32 as indicated by the arrows 4 and at the same time, each milling tool 42, 44, 46 and 48 moves radially inward toward the hub 32 as indicated by the arrows 3 grinding the platters into small particles.

When the milling tools 42, 44, 46 and 48 reach the hub 33, the movement is reversed and the milling tools 42, 44, 46 and 48 are rotated about the hub back to their original position. At the same time, the milling tools 42, 44, 46 and 48 are move radially outward as indicated by the arrows 7 into their outermost position. Simultaneously, the milling tools 42, 44, 46 and 48 are raised as indicated by the arrows 6 into their original position. The various methods proposed for the milling destruction of the information bearing sectors, the platters, of the 3.5 inch HDDs and HHDs allow for the platter hubs to remain intact for reuse after a secondary automated or manual dismantling.

The current embodiment also has the capacity to destroy the information bearing sectors, specifically the NAND flash memory circuit boards, of 3.5 inch and 2.5 inch HHDs and SSDs. Once the circuit boards with the information bearing NAND pods have been removed from the hard drives' chassis, using either the front and/or back small non-destructive dismantling and suction fixture 200 or 300, the circuit boards are placed or fall onto the conveyor belt 23. Then the circuit boards can be automatically segregated from the rest of the collected components using a visioning or optic scanner, or manually so a surface mill (not shown) can pass over the top of the circuit boards reducing the NAND flash memory pods to fine particulates. The remainder of the circuit boards stays intact for downstream commodity processing. Additionally, the system's operator can also elect to completely mill the entire circuit board if full destruction is required. The particulates are then collected with an integrated vacuum system with a HEPA filter. However, this step can also be bypassed if it is the intention of the system's operator to reuse the NAND flash memory circuit boards of 3.5 and 2.5 HHDs and SSDs.

Figure 13:
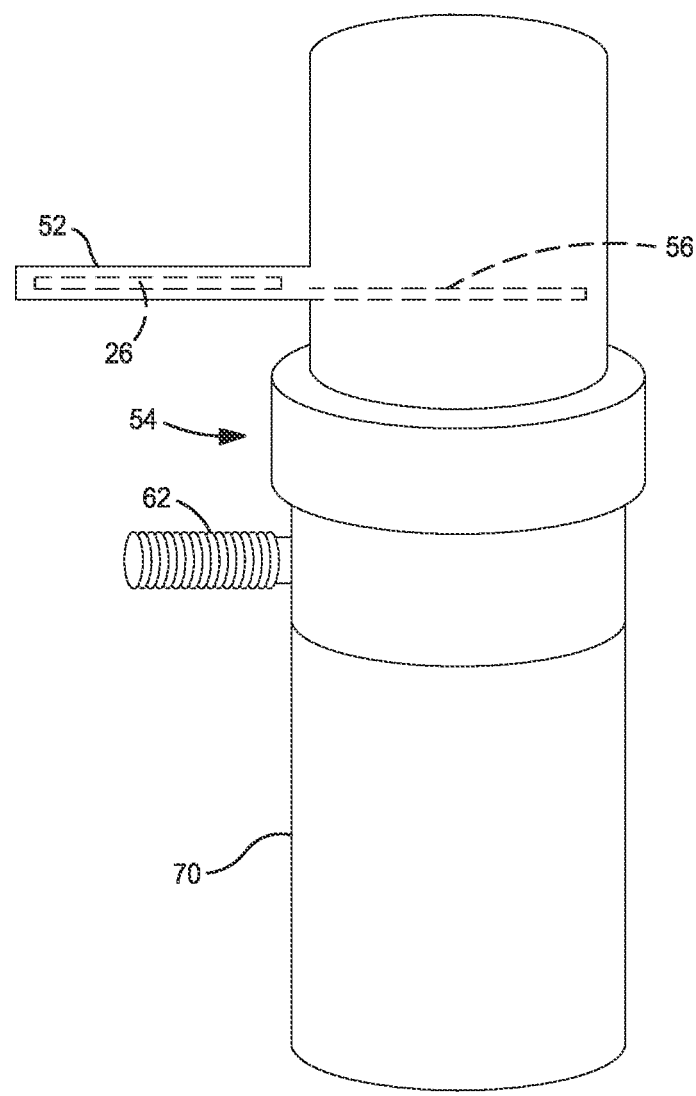
FIG. 13 is a side view of a burr grinding system for destroying 2.5 inch HDD and HHD data containing platters.
Figure 14A:
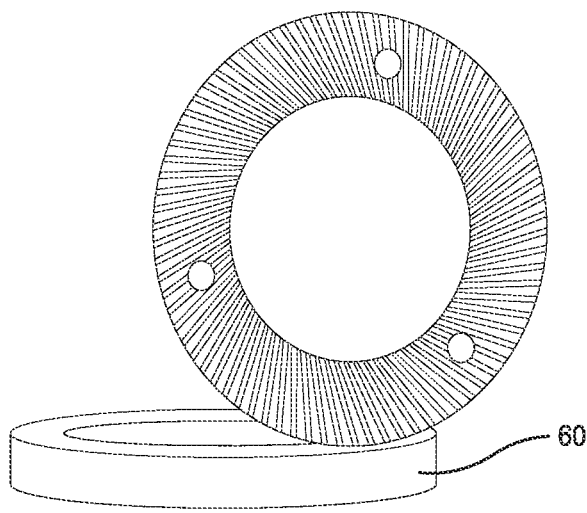
FIGS. 14a and 14b are isometric views of a flat burr grinder and a conical burr grinder respectively used in the burr grinding system.
Figure 14B:
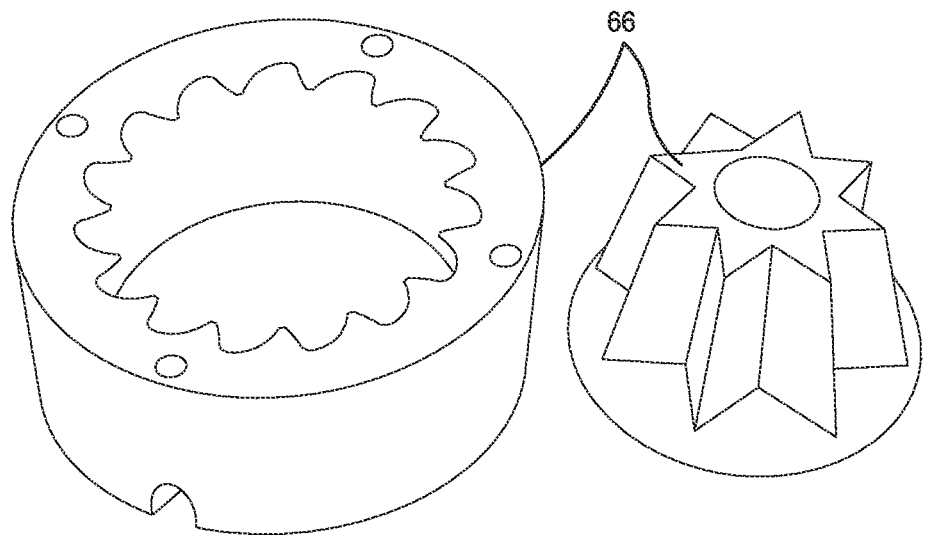
Figure 15:
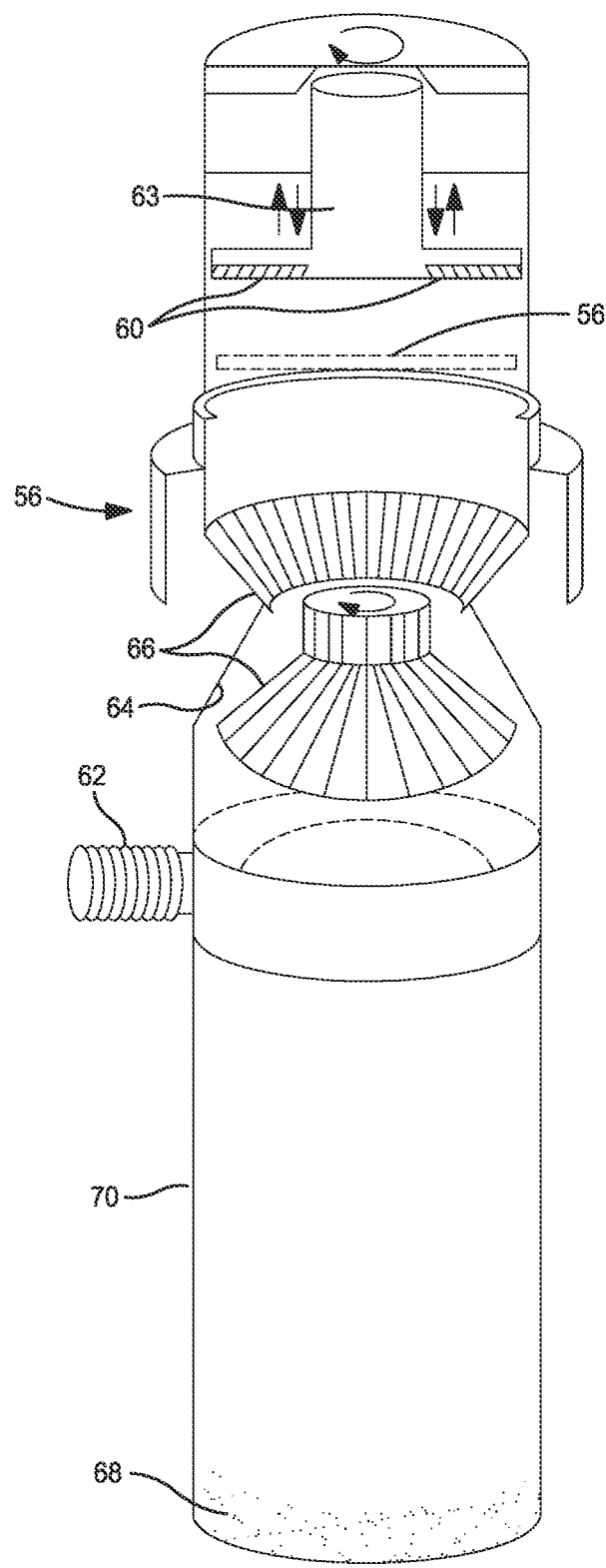
FIG. 15 is a schematic isometric sectional view of burr grinding system of FIG. 13.
Figure 16B:
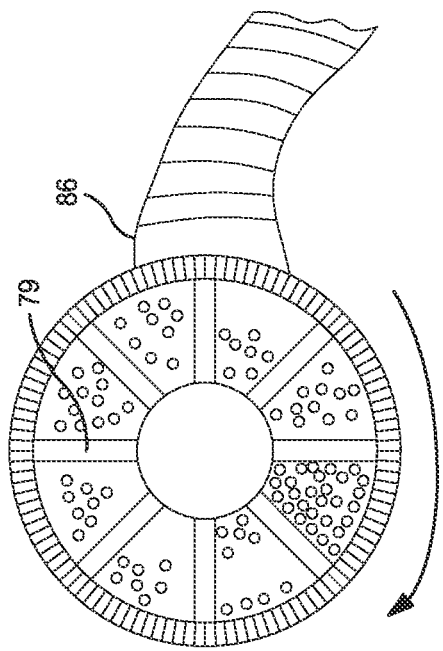
FIGS. 16a-16d are various isometric views components of a 2.5 inch HDD and HHD lapidary flat lap grinding system.
Figure 16D:
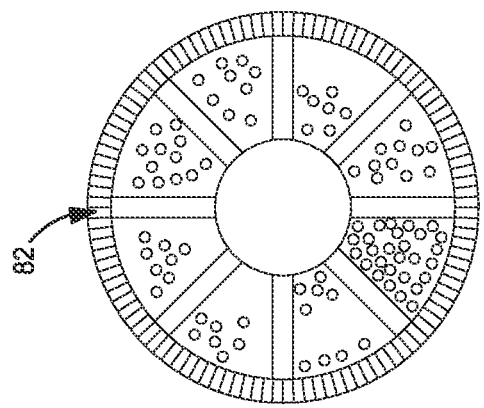
Figure 16A:
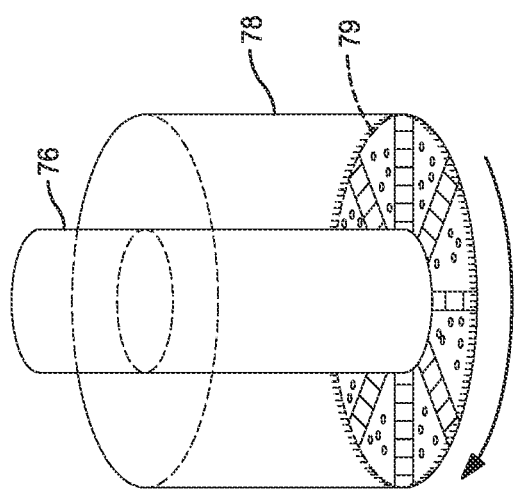
Figure 16C:
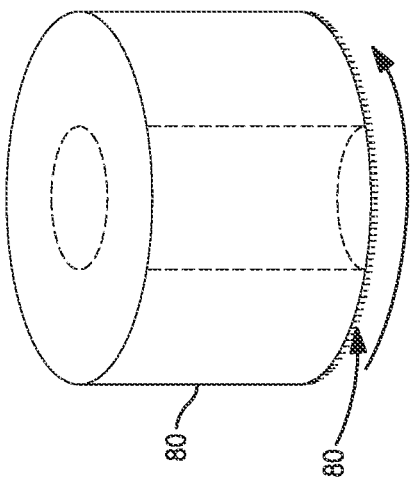
Figure 17:
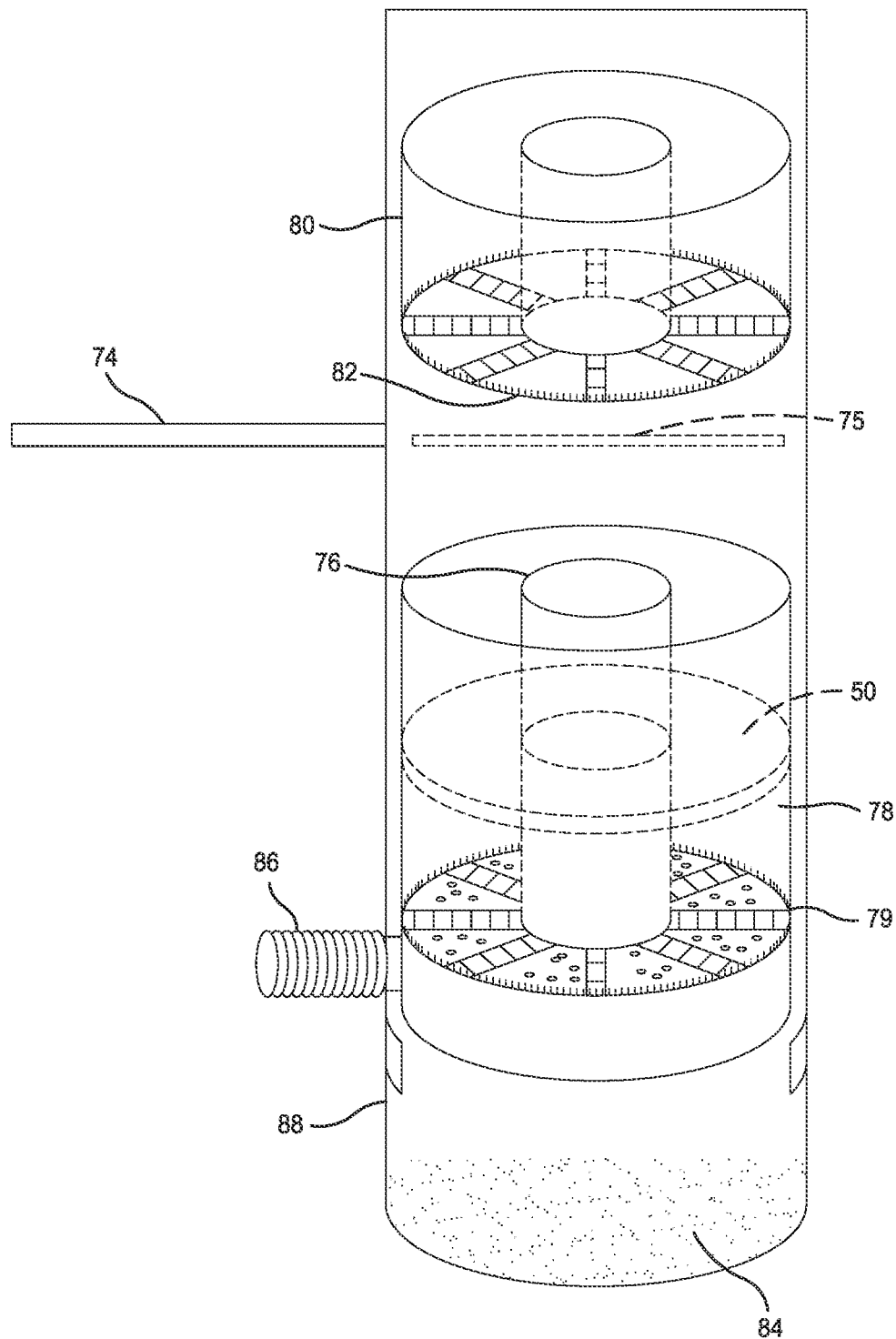
FIG. 17 is a schematic cross-sectional view of a flat lap grinding device using the components of FIGS. 16a-16d.

Unlike 3.5 inch HDD and HHD platters that are primarily made of ridged aluminum, the handling and destruction of 2.5 inch HDD and HHD information platters require more care because of their fragile composition consisting of glass coated ceramic disks. Their method of destruction as shown in FIG. 13 comprises removing the 2.5 inch platters 26 from the partially disassembled hard drive and placing them individually on a platter reception tray 52 of a burr grinding device 54. The platters 26 are then automatically indexed into the milling chamber 58 of the burr grinding device 54 through a slotted port 56. Inside the milling chamber 58, there is a rotating flat burr grinder 60 on a plunger 63 of the type shown in FIG. 14a above the inserted platter 26, which periodically plunges down to break the platter 26 into small pieces. A vacuum system 62 is used to help draw the platter fragments through a cone shaped receptor 64 into a conical burr grinder 66 of the type show in FIG. 14b. The conical burr 66 reduces the platter fragments into a powder consistency 68, which is deposited into a collection receptacle 70. If the system's operator desires, the non-destructive dismantling system can also be programmed to bypass the physical destruction of the 2.5 inch HDD and HHD platters leaving them detached or connected to the spindle hub for reuse.

Another method that can be used to destroy 2.5 inch HDD and HHD platters 50 is the use of a modified lapidary flat lap grinding device 72 as shown in FIGS. 16a-16d and 17. The suction mechanisms of the front small hybrid non-destructive dismantling and suction fixture 300, carefully removing the glass coated ceramic platters 50 from the partially disassembled hard drive and placing them individually on a platter reception tray 74. The platter 50 is then automatically indexed into the body of a lap mill grinding device 72 through a slotted port 75. The platter 50 is then placed around the centering spool 76 of a bottom grinding mill 78 that has a grinding surface 79 facing upwardly. Next, a weighted top mill 80, with a grinding surface 82 on its bottom, is placed over the bottom grinding mill 76. By sandwiching the platter 50 between the top and bottom grinding mills 82 and 78, continuous pressure is applied to both surfaces of the platter; and it prevents the partially ground platter particles from escaping. The top and bottom grinding mills 82 and 78 rotate counter-clockwise to each other until the information bearing platter 50 is reduced to a pulverized residue 84. The remains are collected with a vacuum system 86 and deposited into a collection receptacle 88. The spindle motor, which contains rare earth metals, can also be retrieved at this point. The previous destruction methods, [0063 and 0064], for the 2.5 inch HDD and HHD platters can be bypassed if the system's operator desires to reuse them.

The spindle hubs of HDD and HHD hard drives contain trace amounts of rare earth magnets. After the information bearing platters have been removed, by milling or automated extraction, the spindle hubs can be collected in their own segregated container 31 or the systems operator can program the machine to drop the spindle hubs onto the conveyor belt for further downstream processing.

Figure 24:
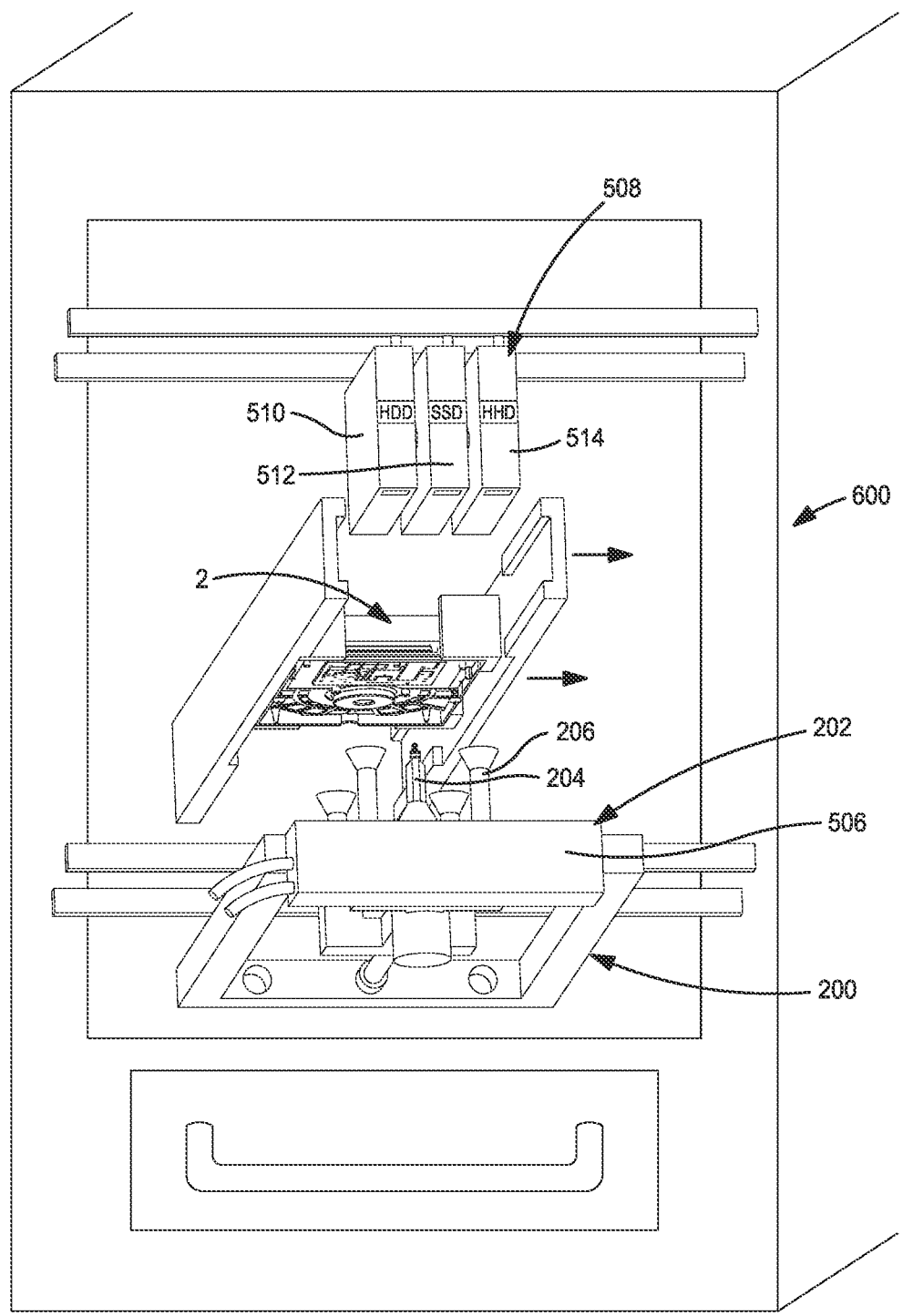
FIG. 24 is a perspective front view of an alternative version of the standalone machine with the hard drive positioned horizontally.
Figure 25:
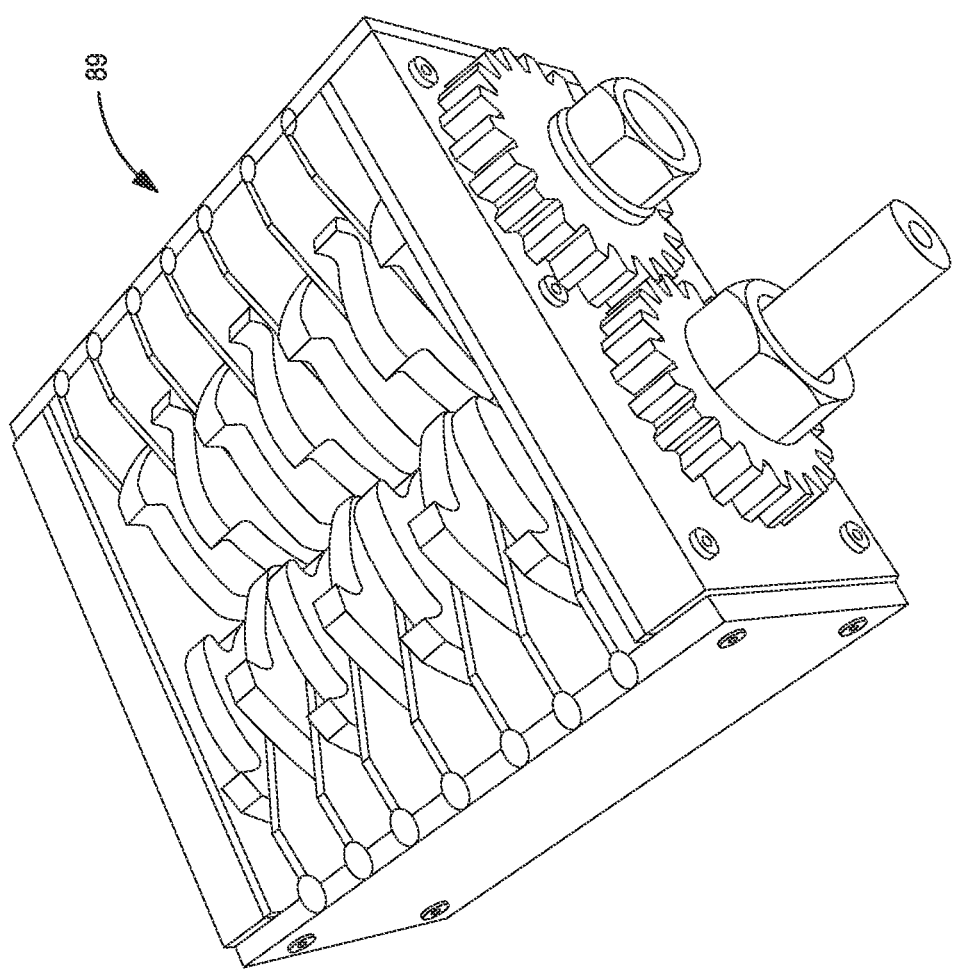
FIG. 25 is an isometric view of a small shredder that may be incorporated into the machine of FIG. 1.

The present embodiment can also utilize a small shredder 89 or hammer mill to destroy the 3.5 inch and 2.5 inch platters of the hard drives. A typical small shredder 89 of the type well known in the art is shown in FIG. 24. The destruction method is carried out when the information platters are dismantled from the hard drive with the front small hybrid non-destructive dismantling and suction fixture 300 and placed on to the system's conveyor belt 23. Sensors are used to identify the 3.5 inch and 2.5 inch platters. Then the platters are segregated from the other recovered components; and directed to the shredder where the platters are reduced to particulates that are 2 mm or less. Alternatively, the recovered platters can also be placed directly in a shoot that funnels them directly into the shredder. A vacuum system with a HEPA filter is used to safely collect the particulates. However, the small shredder or hammer mill destruction method can also be bypassed if the system's operator desires to reuse the information bearing platters of the 3.5 inch and 2.5 inch hard drives.

Stage 3 in the overall process: The 3.5 inch aluminum hard drive chassis (2) remains in the secondary dismantling chamber 22 where the screw/fastener removal tool bit 302, of the front small hybrid non-destructive dismantling and suction fixture 300, is automatically exchanged with a hole cutting tool (not shown), which proceeds to bore/core out the spindle motor embedded in the base of the hard drive chassis. The aluminum slug containing the spindle motor falls onto the conveyor belt below, for further downstream processing. However, this step can be bypassed if it is the intention of the system's operator to reuse the hard drive chassis and its embedded spindle motor.

Because of the comprehensive non-destructive dismantling sequences stored on the system's databases, the present embodiment has the ability to dismantle hard drives that have varying layers of assembly. The system's programming further allows the integration of additional coordinates for the removal of other desired components from the hard drives.

The described non-destructive dismantling process can also be performed in a linear fashion where the hard drive is placed in the vertical holding chassis; and then advances forward, along the system's transportation rails, through a series of secondary non-destructive dismantling chambers (22); where the corresponding small, front and back, hybrid non-destructive dismantling and suction fixtures 200, 300 perform distinct/specific dismantling tasks from the outside to the inside of the hard drives.

The present system can also be configured to perform the dismantling process horizontally where the front large six-unit hybrid non-destructive dismantling and suction fixture 200 is positioned over the top of the hard drive in the primary dismantling chamber 22; and the front small hybrid non-destructive dismantling and suction fixture 300 is positioned above the hard drive in the secondary dismantling chamber 22. The system's hard drive holding chassis 4, which is also positioned horizontally, indexes the hard drive into the primary dismantling chamber 8, along the hard drive transportation rails 9. The screw/fastener removal units 204 of the six-unit non-destructive dismantling and suction fixture 200 proceeds to remove the screws/fasteners from the hard drive's cover in a rapid sequential process under the guides of the machine's databases. Then the corresponding suction units 206 of the six-unit dismantling fixture 200 systematically remove the hard drive cover, in a pick and place manner, onto the machine's conveyor belt 23.

Figure 18:
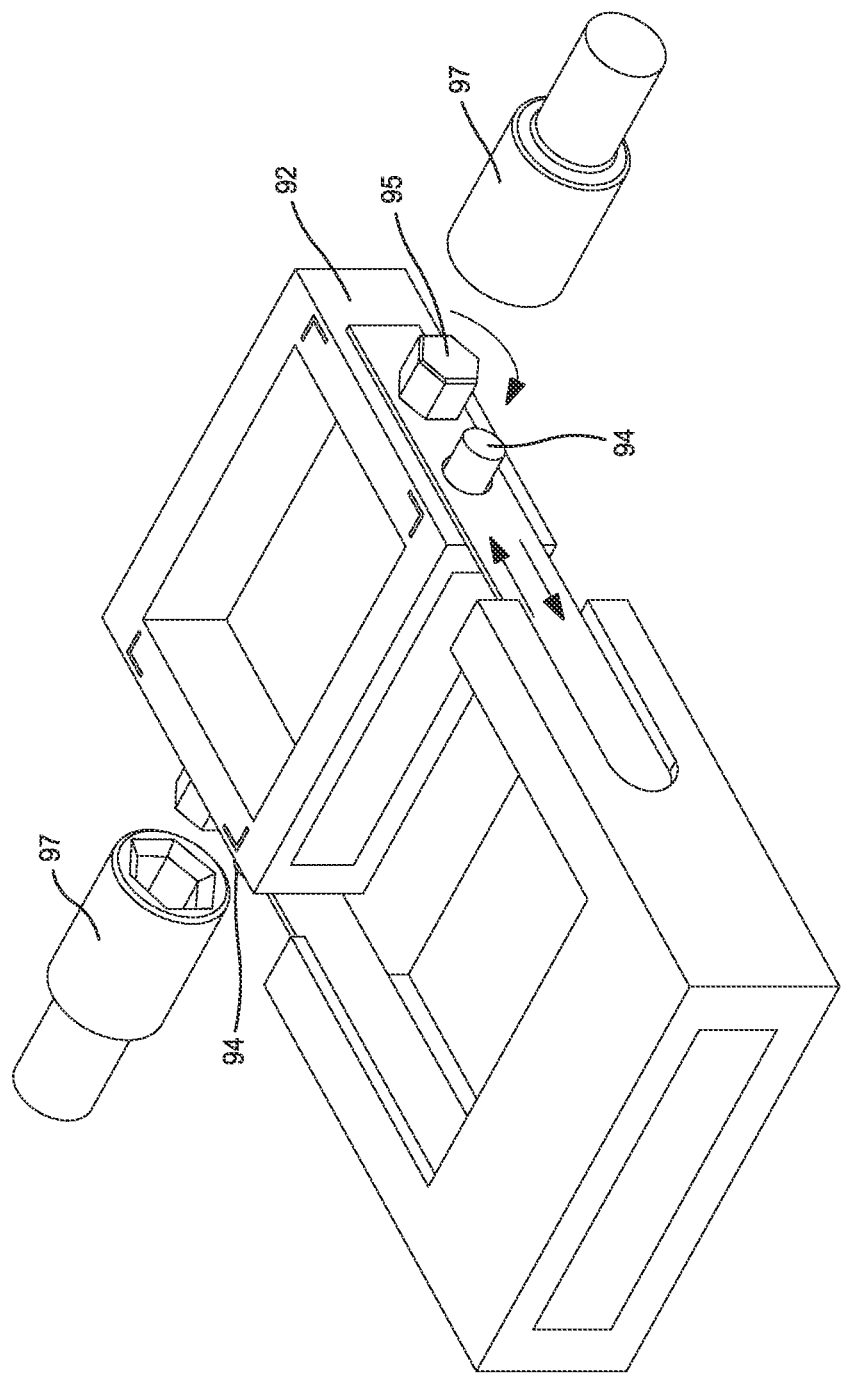
FIG. 18 is an isometric view of a 180 degree holding chassis.

Unlike the vertical disassembly method previously mentioned, there are no small non-destructive disassembly and suction fixtures 300 simultaneously removing targeted components from the back of the hard drive in the primary or secondary dismantling chambers. Instead, the horizontal dismantling configuration transports the hard drive through the secondary dismantling chamber, along the transportation rails 9, into the 180 degree holding chassis 92 as shown in FIG. 18. The chassis rotates 180 degrees along the y axis, performing a Gamma rotation, to position the back/bottom-side of the hard drive now facing up. The rotation of the holding chassis 92 is performed by the chassis turning mechanism 97, which is partially represented in FIG. 18. Hex knobs 95 on either side of the chassis 92 are adapted to be engaged by a turning mechanism 97 to rotate the chassis. Automatic locking pins 94 on either side of the rotating hard drive chassis secure it into position on the extension-retraction slides on the left and right of the chassis. The turning of the 180 degree chassis also allows for loosened components to free-fall onto the conveyor belt below. Then the hard drive is shuttled back into the secondary dismantling chamber 22 where the small non-destructive dismantling and suction fixture 300, positioned over the top of the hard drive, proceeds to unscrew or mill the targeted components from the back/bottom-side of the hard drive based on the desired outcome of the system's operator. The integrated suction units 306, of the small non-destructive fixture 300, remove the targeted components placing them in their designated receptacles (as previously outlined) or on the conveyor belt 23 for further downstream automated or manual processing. Then the hard drive is shuttled back into the 180 degree holding chassis 92, along the machine's transportation rails 9, where the hard drive is flipped once again, and then shuttled along the transportation rails 9 back into the open end of the secondary dismantling system's holding chassis.

After the removal of the hard drive's cover in the primary dismantling chamber 8, the double sequence between the secondary dismantling chamber 22, and the 180 degree holding chassis 92 continues until the desired components have been removed from the outside to the inside of the hard drives' chassis. The 180 degree rotation of the hard drive also facilitates the free-fall of loosened components onto the machine's conveyor belt. The dismantled hard drive is then ejected from the 180 degree holding chassis onto the conveyor belt for further downstream automated or manual processing.

The described embodiment can also be performed in a semi-automated manner with regard to how the components are collected. The system's operator will rely on the automated screw/fastener units, of both the six-unit hybrid non-destructive dismantling fixture 100 located in the primary dismantling chamber 8 and the small hybrid non-destructive dismantling fixture 300, located in the secondary dismantling chamber 22, to remove the targeted components identified by the machine's databases. However, in this adaptation, the integrated suction fixtures 106, 306 of both the six-unit hybrid non-destructive dismantling fixture 100 and the small hybrid non-destructive dismantling fixture 300, that perform the integrated pick and place processes of the respective fixtures, are bypassed/suspended. Instead, the removal of the targeted components is performed by the flipping motion of the 180 degree holding chassis 92 which allows the dismantled components to free-fall onto the system's conveyor belt 23. The semi-automated dismantling process also has the option of utilizing the clamping mechanism 25 and/or the magnetic clamp mechanism 27 as an additional method for aggressively removing the targeted components. The captured components are transported downstream for further automated or manual processing. The information bearing material can be destroyed using the prescribed destruction methods, previously mentioned; if incorporated into the system and desired by the system's operator.

The non-destructive dismantling machine can also have the option of being configured with an automated hard drive "magazine" loader to further expedite the process.

Although the present embodiment is described in various configurations, automated to semi-automated, for dismantling hard drives, the process can be further consolidated by combining the respective operations of both the primary dismantling chamber and the secondary dismantling chamber into a single chamber where all stages of dismantling occur.

The non-destructive dismantling machine's computer interface, linked by an Ethernet cable or wireless connection, will allow the present embodiment to be performed and monitored onsite or remotely requiring minimal or no human interface. The computer interface will also allow for programmatic updates to the system's databases.

The non-destructive dismantling machine's operating system keeps track of the drives that are introduced to the system. When the non-destructive dismantling process is completed a Certificate of Destruction 96 such as shown in FIG. 19 can be generated which, consists of the manufactures' barcodes from the dismantled drives and the corresponding company asset tags (if present). The captured identification numbers will automatically populate the fields in the Certificate. The Certificate can also consist of the name of the company receiving the service, name of person authorizing the non-destructive dismantling process, company personnel witnessing the non-destructive dismantling process, the time and date of the non-destructive dismantling; and the name of the technician performing the non-destructive dismantling process.

Additional variables can be added to the Certificate and systems databases like a running count of sub-components collected; their relative weights; and their value based on current commodity and non-commodity pricing along with other dismantling demographics for productivity reports. However, some of the previously stated variables may not be utilized based on where the company operating the non-destructive dismantling machine is positioned in the products recovery continuum. The operating system will also allow for the contents of the Certificate to be included with the material retrieved QR and Data Matrix codes to be printed immediately or saved to a Word document or convert it to a PDF that can be stored for future use or delivered electronically to another computer, smartphone or tablet.

The majority of Hard Disk Drives (HDDs) have their circuit boards externally mounted on the back of the drive. The above described non-destructive hard drive dismantling system can be modified to provide a stand-alone system 500 shown in FIG. 20 that will focus on the automated removal of circuit boards prior to or after the processing of HDDs. This ensures maximum recovery value of the circuit boards for either reuse or recycling of targeted metals and precious metals. Hybrid Hard Drives (HHDs) are also included if their particular make and model consist of an externally mounted circuit board on the back of the drive.

In essence, an automated non-destructive standalone circuit board removal system 500 would essentially comprise a screw/fastener removal chamber 502 similar to the primary dismantling chamber 8 of the above-described non-destructive hard drive dismantling system 6. The hard drive 2 is placed in a holding chassis 504 with the back of the hard drive 2 facing to the rear. Then, the drive 2 is automatically indexed into the machine's screw/fastener removal chamber 502 that includes a small hybrid non-destructive dismantling and suction fixture 200 similar to the fixture in that in the dismantling system 200.

The operating system of the non-destructive circuit board removal machine 500 will consist of the following to aid in the identification of drives in the holding chassis and convey specific coordinates to the system's varying CNC interfaces:

1). A scanning system 506 including a barcode reader system that has a database of all the manufacturers' barcodes for all the 3.5 inch and 2.5 inch HDDs and HHDs that are currently or were formerly available in the market. The manufacturers' barcodes that are captured with the reader will help the overall system determine the specific type of hard drive placed in the holding chassis, either a 3.5 inch or 2.5 inch HDDs or HHDs, which will be conveyed to the product visioning database and G-code or conversational programming database to aid in the appropriate non-destructive circuit board dismantling/removal sequence to perform on the respective drives. The barcode reader system will have the capacity to capture corporate asset tags placed on the hard drives and couple them with their corresponding manufactures' barcodes. The barcode reader system will also have the capacity to read QR and Data Matrix Codes that are directly applied by the manufacturer or third-party source like a governmental agency, public/private corporation or organization. The information retrieved may consist of a link to the manufacturers' or supporting companies' website. The Codes may also provide text content like the make and model of the respective drives' as well as specifications on the drives' circuit boards.

Figure 20:
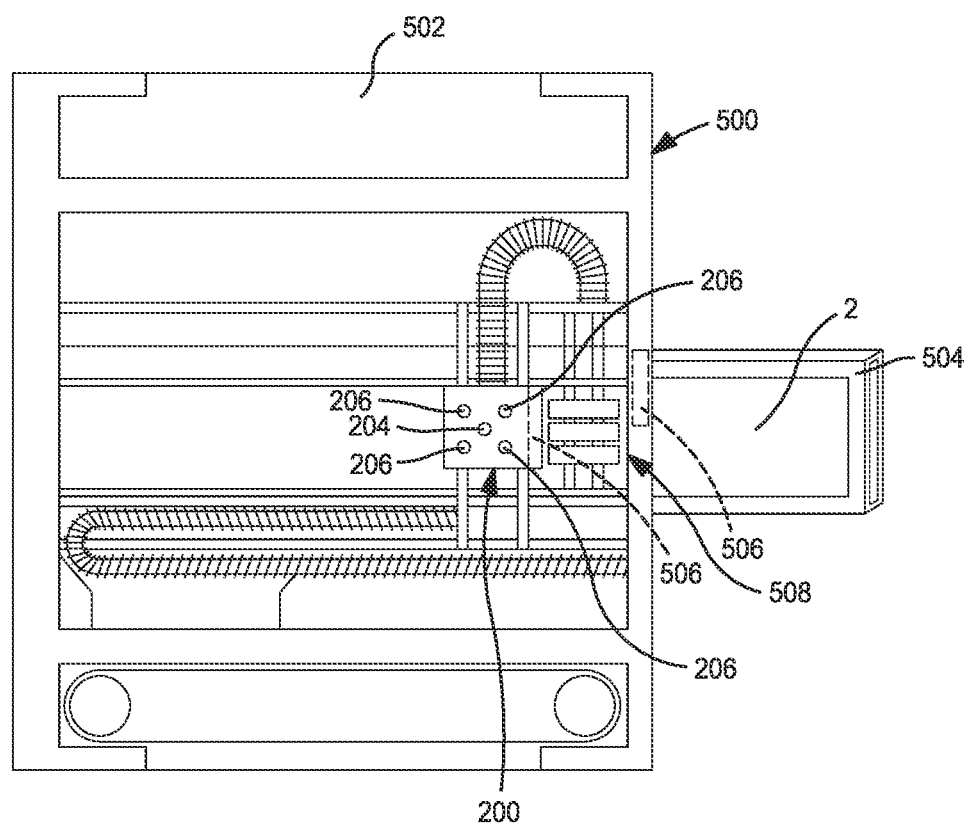
FIG. 20 is a schematic side view of a standalone machine for the removal of the circuit boards of a hard drive.
Figure 21:
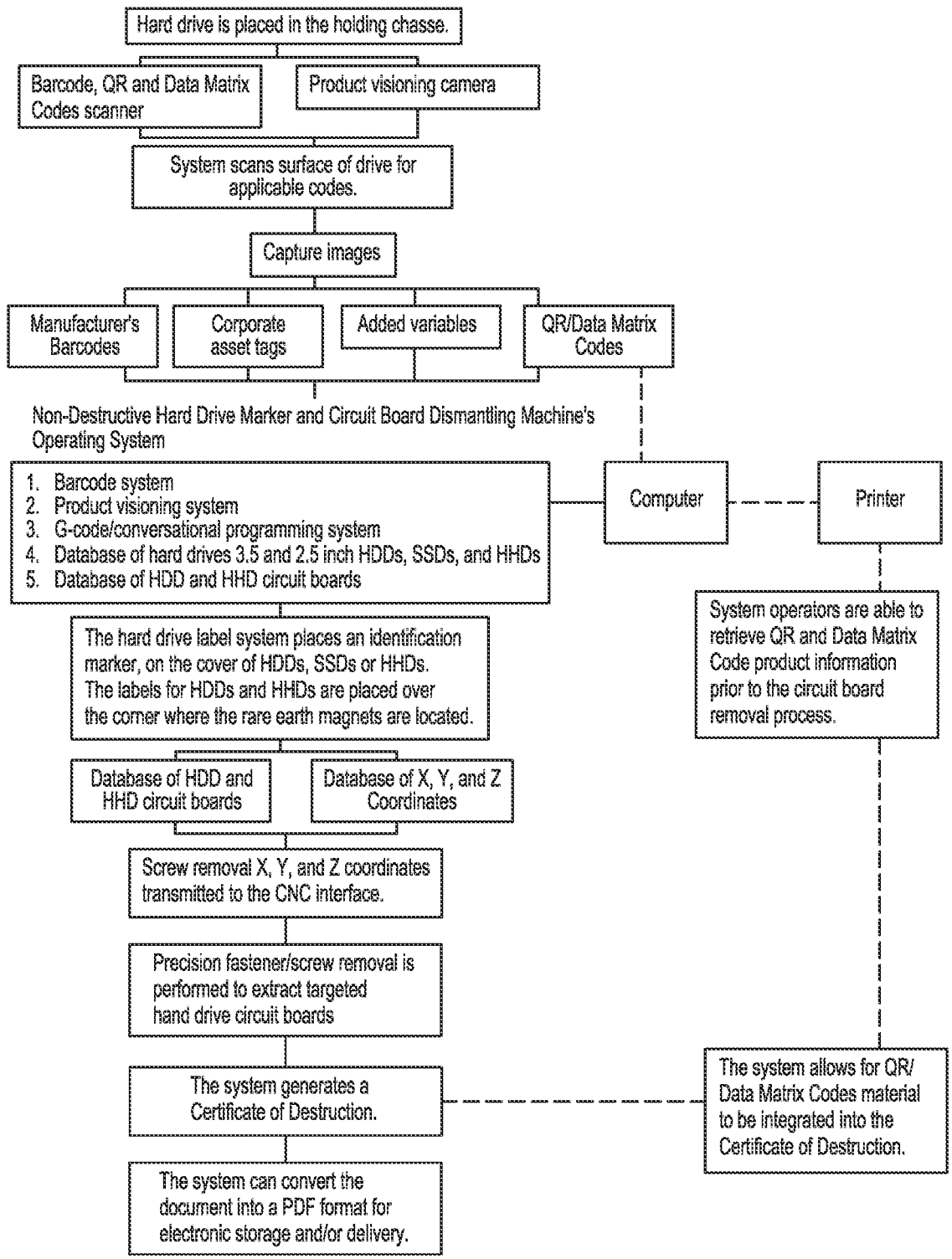
FIG. 21 is a flow chart of the operation of the standalone machine.

When the QR and Data Matrix Codes of an HDD are scanned by the scanning system 506 shown in FIG. 20, it can also provide specific non-destructive dismantling instructions; shipping instructions to appropriate processing facilities; and current commodity as well as non-commodity pricing. Information gathered from the respective databases of the non-destructive circuit board dismantling machine's operating system can print the retrieved information prior to beginning or upon completion of the circuit board dismantling process. Additionally, the system will be able to produce a Certificate of Destruction or Processing to inventory the drives that had their circuit boards dismantled/removed. The Certificate can be printed or converted to a PDF to be electronically stored or transmitted.

2). The scanning system 506 also includes a product visioning system with a database comprised of all the 3.5 inch and 2.5 inch HDDs and HHDs that are currently or were formerly available in the market. Each hard drive stored in the database has images of their targeted components primarily consisting of: 1) the hard drive cover 12, mainly for added product recognition and product orientation within the primary dismantling chamber; and b) the circuit boards that will be accompanied with corresponding x, y, and z numerical coordinates to aid in their extraction.

3). A G-code or conversational programming system with a database, of all the 3.5 inch and 2.5 inch HDDs and HHDs, that are currently or were formerly available in the market, will house the pictorial images of the respective drives' circuit boards. Corresponding tool path coordinates will also accompany the images to guide the systematic non-destructive circuit board dismantling/removal from the hard drive. Each of the respective operating system's databases will have the capacity to integrate information from newly developed hard drives that are produced in the future.

The operating system of the non-destructive circuit board dismantling machine has the capacity to print the retrieved information prior to beginning or upon completion of the circuit board dismantling process. The operating system also has the capacity to save retrieved information as a word Document or convert it to a PDF that can be stored for future use or delivered electronically to another computer, smartphone or tablet.

The primary objective of the standalone circuit board removal system 500 is to separate the external circuit boards from HDDs in an automated fashion. However, the same operating system, consisting of a barcode, visioning, and G-code databases, found in the hard drive non-destructive dismantling system is also used in the stand-alone circuit board removal system. The multi-use operating system allows the stand-alone circuit board removal system to differentiate HDDs, from SSDs and HHDs, which is difficult to achieve based on visual inspection using one's eyes.

Figure 22:
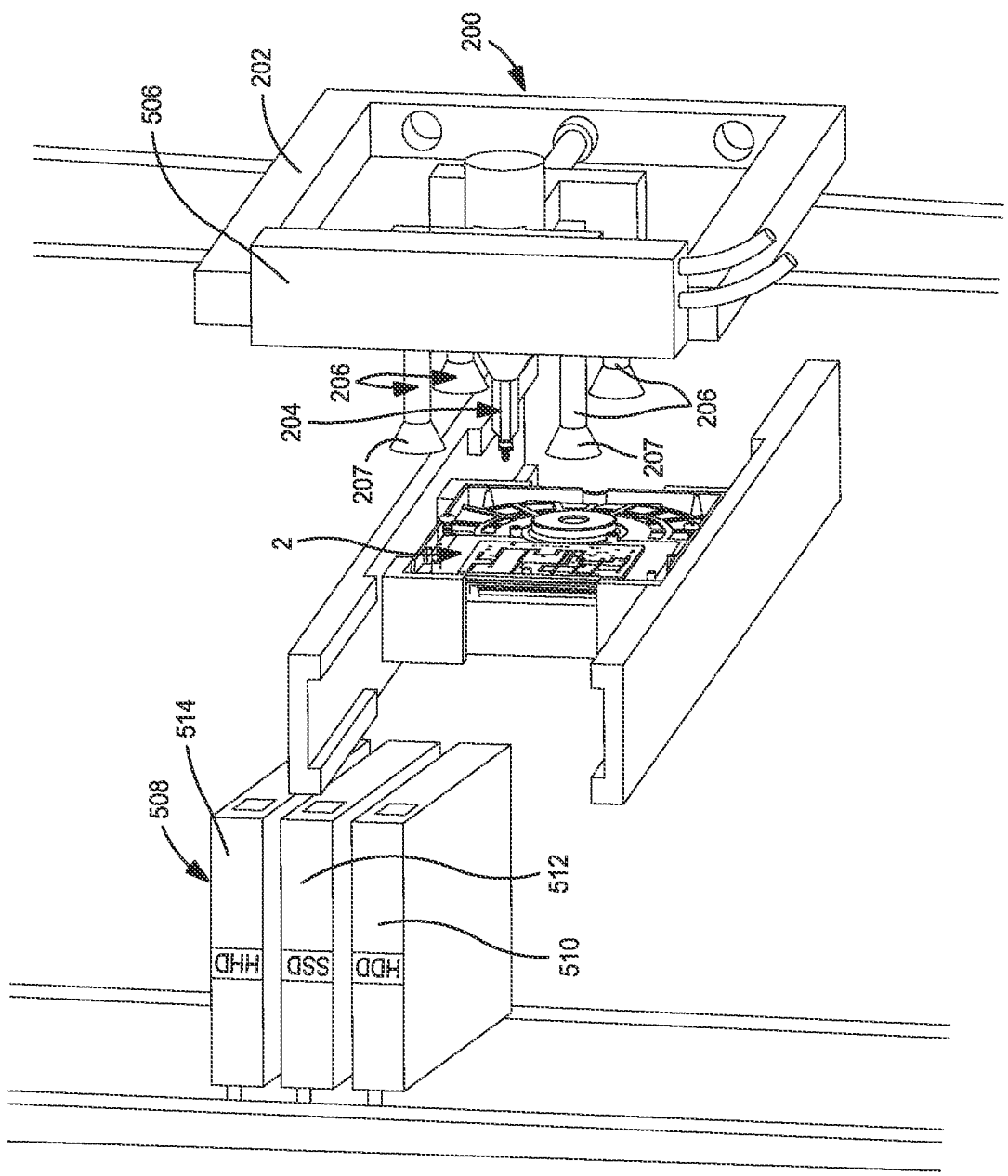
FIG. 22 is a perspective schematic side view of a back small non-destructive dismantling and suction fixture of the standalone machine of FIG. 20.

During the identification phase of the hard drives, the circuit board removal system 500 can obtain information to activate a labeling apparatus 508 for placing visual or magnetic adhesive markers on the drives, which will assist in differentiating the three types of drives, HDDs, SSDs and HHDs as shown in FIG. 22, while further segregating HDDs for circuit board removal. HHDs will also be segregated for circuit board removal if their make and model indicate that they have rear mounted circuit boards. The labeling apparatus includes labeling devices 510, 512, 514 for dispensing and adhering labels for HDD, SSD, and HHD drives respectively. The labeling devices 510, 512. 514 are controlled by the operating system with information from the scanning system 506 as shown in FIG. 22.

Figure 23:
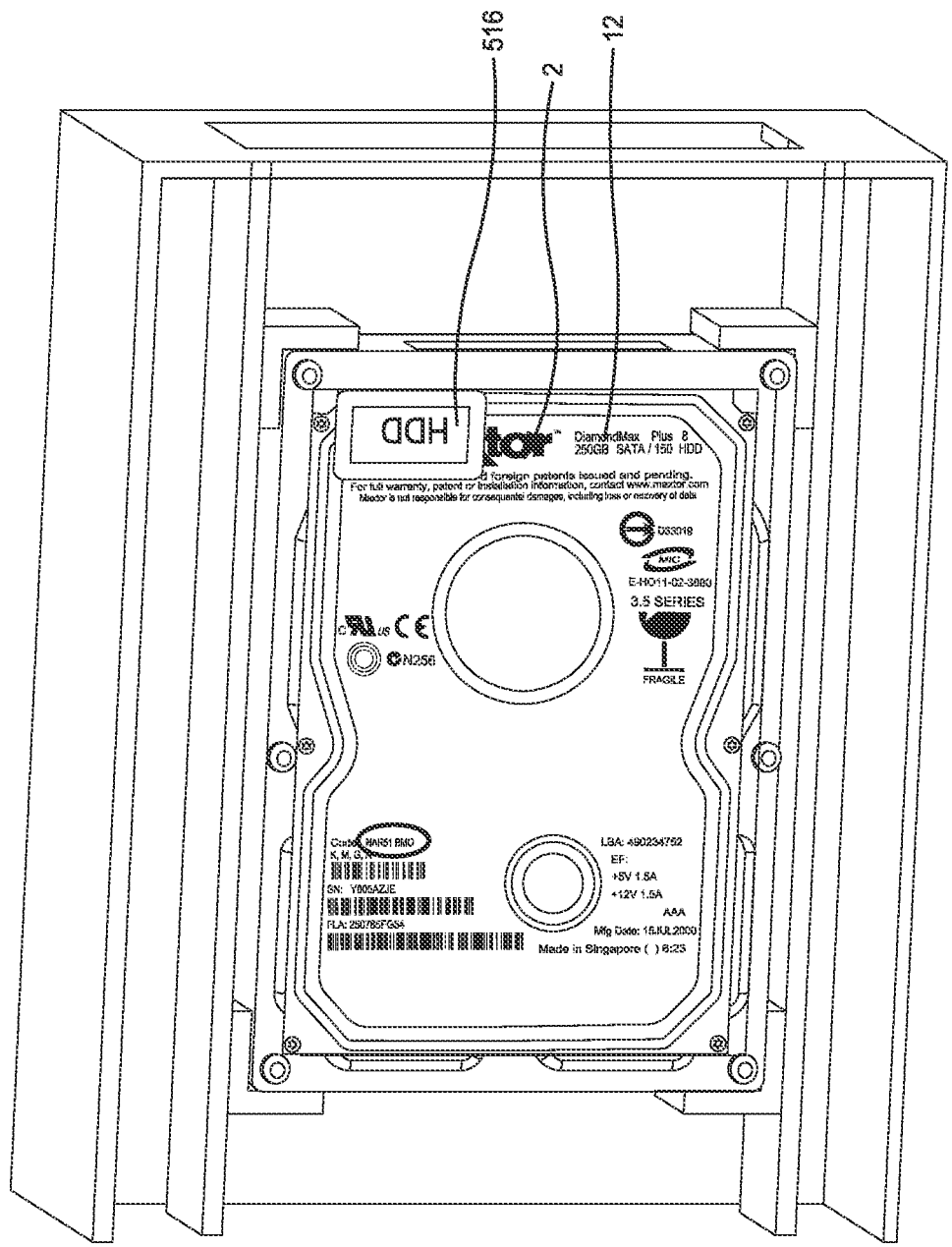
FIG. 23 is a view of a hard drive after it has had a label applied in the standalone machine of FIG. 20.

When HDDs are identified their marker 516 is placed on the corner of the hard drive 2 where the rare earth magnets are located as shown in FIG. 23. The markers further expedite the harvesting of the rare earth magnets during downstream processing. To a lesser extent, the rare earth magnet markers can also be placed on HHDs, even though the HHDs have a lower concentration of rare earth magnets than HDDs.

Based on the type of drive identified in the holding chassis 504, the holding chassis 504 is moved into a position to enable the small hybrid non-destructive dismantling and suction fixture 200 of the type shown in FIG. 3b to proceed to remove the fastening screws under the direction of the operating system.

The automatic screw driver 204 of the small hybrid non-destructive dismantling and suction fixture 200 begins removing the screws/fasteners, holding the circuit board without damaging the screws or threaded holes where the screws were fastened. The present process allows the screws to be reused. However, to expedite the screw removal process, the present process can also accommodate interchangeable screw removal fixtures that bore/core into the heads of the targeted screws. Then the screws are turned in a counter-clockwise manner extracting whole screws from their fastened positions. Although the screws cannot be reused, the threaded holes where the circuit boards were fastened remain intact for reuse when new screws are used to refasten new circuit boards. To further expedite the dismantling/removal of the circuit boards from the hard drives, without being able to reuse the screws or the chassis of the hard drives, the system's operator may choose an interchangeable boring/coring tool to completely bore/core out whole screws and their corresponding thread holes.

Once the screws have been removed, the suction fixtures 206 of the standalone circuit board removal system 500 are activated to remove the circuit board from the surface of the hard drive. The hard drive is then ejected from the system and a new hard drive is placed in the system's holding chassis to repeat the circuit board removal process. If an SSD or HHD, without an external circuit board is identified prior to being inserted into the holding chassis it rerouted for alternative processing.

The non-destructive circuit board removal system 500 can also utilize the 180 degree holding chassis 92 shown in FIG. 18 to release the circuit boards from the hard drive. In this application, the suctioning apparatus of the hybrid fixture is deactivated and the chosen method for screw removal, either 1) screw removal for reuse, 2) screw removal without screw reuse, or 3) completely boring/coring out the screw and its thread holes, is selected by the system's operator based on their decision to reuse the hard drive chassis or expedited the recovery of circuit boards. When the screw removal process is complete the 180 degree holding chassis 92 rotates horizontally causing the circuit boards to free fall into a collection container or onto a conveyor belt for further downstream automated or manual processing.

As an alternative, a standalone circuit board removal system 600 can be provided in which the hard drive chassis is positioned to hold the hard drive 2 in a horizontal position with the back of the hard drive 2 having the circuit board facing down. In this case, the small hybrid non-destructive dismantling and suction fixture 200 is positioned below the hard drive 2 and the labeling apparatus is positioned above the hard drive 2 as shown in FIG. 24.

The algorithm of the present embodiment's operating system and circuit board removal process has the capacity to be integrated, in part or in total, into other manufacturer's systems that are currently being developed or developed in the future.

Figure 26:
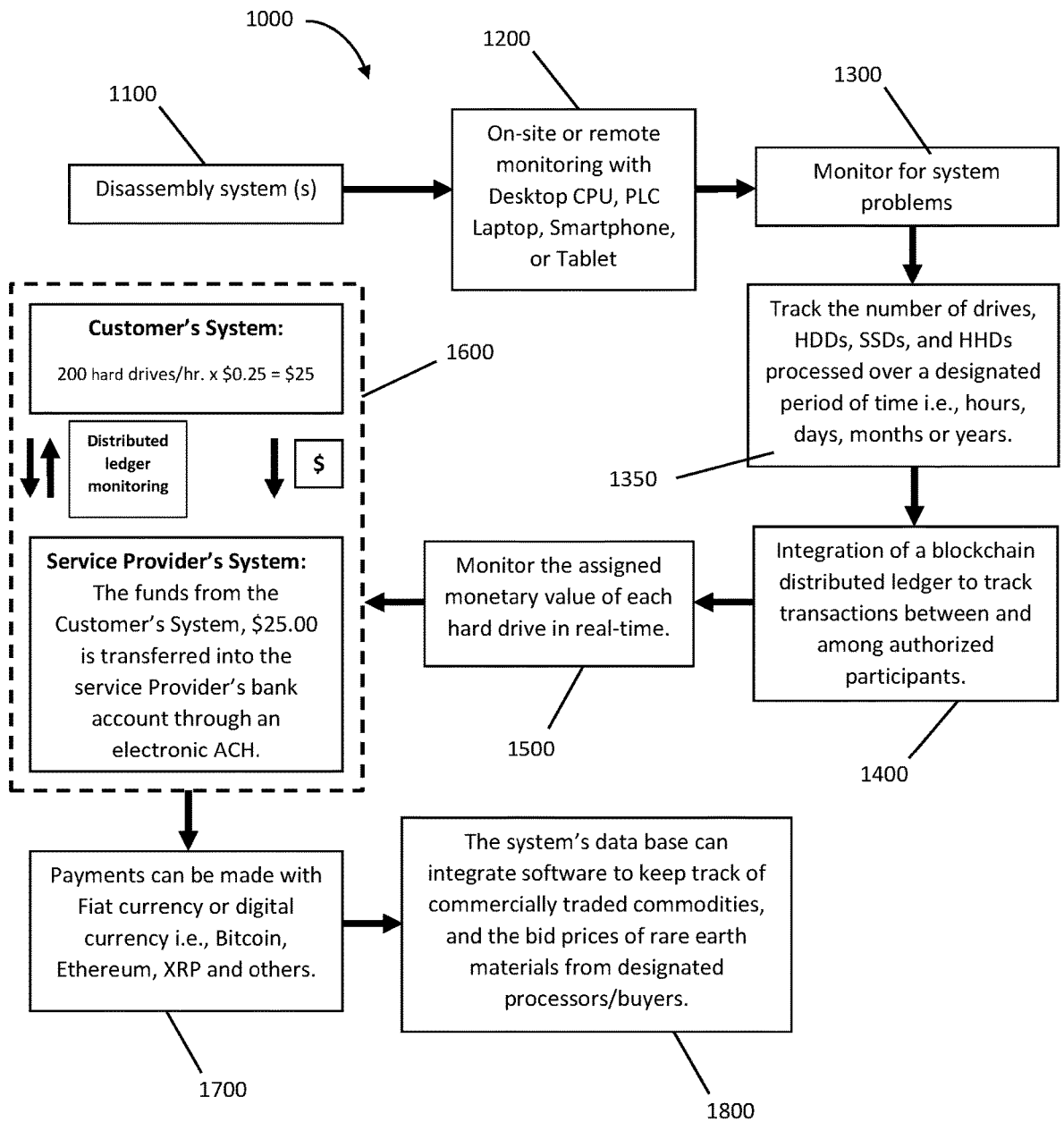
FIG. 26 is a functional block diagram of a management system for a hard drive dismantling system.

With reference to FIG. 26, a management system for a hard drive dismantling system is generally designated by the numeral 1000 and is employable with the previously described dismounting systems and standalone systems 500 and 600 which are collectively designated by the numeral 1100. The system 1000 allows for the integration of the Internet of Things (IOT) where a single system or multiple systems can be monitored onsite or remotely with a computer system ranging from a traditional desktop CPU or laptop as well as a smartphone or tablet as indicated at 1200.

The management system's program at 1300 monitors mechanical operations to anticipate problems and issues trouble shooting measures to keep the system operational or indicate that a technician may need to be dispatched. Problems are identified through manufacturer preestablished process standards. If the management system is operating below a preestablished standard, warning signs will be activated. Primary trouble shooting protocols will be automatically activated for addressing on-site. More involved problems will trigger the dispatching of a service provider. The internet connectivity and the power source primary or backup are also monitored at 1300. In some instances, a replacement unit will be sent to the customer for installation to reduce downtime.

The management system's program will also compile the number of hard drives, HDDs, SSDs or HHDs, processed over a designated period-of-time (hours, shift, days, months, years). Although the management system 1000 is primarily described for application with hard drives, the management system can be adapted to other forms of data storage devices and consumer electronics, such as smart phones, tablets, flat panel TVs and solar panels.

A visioning system at 1350 tracks the number and types of hard drives that are introduced to the system. The hard drives are initially authenticated by the visioning system; and then each hard drive is tagged with a hybrid marker consisting of a magnetic tracer that indicates where the rare earth magnet sectors are located when subjected to a magnetic reader/indicator. The same magnetic tracer is capable of being physically printed on to indicate the type of hard drive being marked, HDD, SSD, HHD or newly developed hard drive introduced to the system. The management system labeling system also serves a visual marker for customers that may not be using a magnetic scanner to identify where the rare earth magnet sectors are located, but are relying on a visual scanner—or even the eyes of the system's operator.

Management system 1000 at 1350 monitors the number of hard drives that are processed during the course of an hour, shift, day, month or year along with the distinct type of hard drive model and number HDD, SSD and HHD or other type of hard drive that may be configured for future use; the cycle times of the individual mechanical systems against preestablished benchmarks; and provide a count of the remaining labels on a spool of labels provided to the customer. The latter count is coupled with an inventory counter to signal that additional labels need to be mailed from the manufacturer to the customer when a set inventory threshold is reached. Management system 1000 will thus allow for 24/7 onsite or remote monitoring.

The management system program at 1400 will also accommodate the integration of a distributed ledger associated with blockchain, which allows authorized parties to keep track of not only the number of hard drives processed over a designated period-of-time, but in instances where contractual arrangements are made between and among parties, the assigned monetary value for each drive can be monitored in real time at 1500.

As indicated at 1600, an example of the distributed ledger application consists of two or more parties agreeing on a set or varying fee to be paid for each hard drive processed by the system. For example, if the customer and the service provider agree on the payment of $0.25 for each hard drive processed by the system; and there are 100 hard drives processed in one hour; the distributed ledger at 1610 will authenticate the 100 hard drives processed and couple them with the agreed upon payment of $0.25 per hard drive for a total amount due of $25.00. These transactions will appear in the ledgers of both parties to allow for the transparent monitoring from the hard drives being processed to the settlement between the customer using the system to the system's provider. The $25.00 dollars that is tabulated will be transferred at 1620 from the customer's bank account, in the form of an automatic clearance house (ACH) transfer, to the service provider's bank account in an agreed upon period-of-time, for example, weekly, monthly or quarterly.

The payment can be fulfilled at 1700 in the agreed upon type of fiat currency with the appropriate exchange rate or payment in the form of digital currency. The type of digital currency like Bitcoin, Ethereum or XRP will be determined by the parties involved.

The management system's software, integrated with the distributed ledger, also at 1800 keeps track of commercially traded commodities like gold, silver, palladium, copper, and aluminum as well as the bid price of rare earth materials from designated processors. These individual or collective prices can be matched against the hard drive OEM's specified use of these metals in the specific model number and type of hard drive circuit boards; and the rare earth magnet assemblies, as well as the collective materials that comprise the entire hard drive's weight, to provide an approximate indication of the gross monetary value of the collective hard drives processed during a designated period of time.

The management system will also be able to store information in its database, which will allow the tracking of hard drives that do not have their circuit boards or rare earth magnet sectors removed, but are redirected for having their memory wiped and reconfigured for re-deployment in the white label sector of the reuse market. Additionally, the management system's software also integrates the bid price of the reconditioned hard drives from designated reuse service provides, which will let the customer using the dismantling system and the management system's service provider have a real time understanding of the monetary value of the drives processed during a designated time.

Although the described system is described for application with hard drives, analytics can also be generated to provide a more in-depth analysis of the overall system's productivity. The system can be adapted to other forms of consumer electronics like smart phones, tablets, flat panel TVs and solar panels.

The described management system is based on the customer owning the disassembled/destroyed hard drive or the recovered subcomponents. The manager receives a set fee for each drive that is processed. The analytics data that is compiled such as the value of the circuit boards based on OEM specs on the amount of the precious metal used on the circuit board multiplied by the current trading price of the respective precious metals provides the gross price of the circuit board. The value of the single circuit board is then multiplied by the number of similar circuit boards that are harvested/removed from the hard drives during a designated period of time like hours, shifts, days, months or years. The management system will have the capacity to calculate the processing fee provided by a series of circuit board smelting companies. The customer has the potential to determine, in real time, the smelting company that will provide the highest financial return. For subcomponents that are recovered for re-use or SSD drives that could possibly be wiped for resale, in a white label protocol, the management system's database will also have the price points database to again provide the customer with real time payments from various downstream companies. Thus, an informed decision can be made about what mix of harvested/removed sub-components will yield the highest financial return. The manager can also set terms with customers to engage in a pre-arranged profit-sharing model.

Commercial values are determined by the publicly traded commodity prices that are offered. The commodities are further subject to the payment prices offered by companies that process the commodities less their processing fees. In the instance where non-publicly traded commodity materials, like Neodymium and Dysprosium, are purchased based on prices offered by the buyer(s), The management system is programed with the offering price of various buyers. This will allow the customer to select the buyer with the best price offering. The publicly traded and non-publicly traded commodity prices are initially pre-programmed into the management system database at the factory. When the systems are placed in the field, remote updates can be made according to real time market pricing or the current/updated non-publicly traded prices from the buyers' website or other form of communicating the updated prices through the internet connection between the management system remote monitoring base and the customer's monitoring interface. The updates can be made with a CPU computer, laptop, tablet or any other hand-held internet communication device as well as manually.

Management system 1000 tracks the number of SSDs that pass through the system. Based on the permission of the customers' clients, the SSDs can be segregated from the rest of the drives to be wiped; and then reconfiguring for re-use (white labeling). Management system can also be programmed with a buyers' pricing for SSDs that will be re-used in the market, which will give the system's operator the ability to review the analytics provided by the management system to make an informed financial decision on the batch of hard drives that are processed during a designated time period of time, such as hours, shifts, days, months or years.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A method of managing an automated dismantling system for hard drives, comprising steps of:
providing a database of identities of a plurality of hard drives, one or more corresponding key characteristics of each hard drive in the plurality of hard drives, and a contract value between a customer and processing party associated with each hard drive of the plurality of hard drives;
automatically monitoring in real time, hard drives provided to the dismantling system via a scanning system in operative communication with the database, which monitoring includes tracking a number and identifying a type of hard drive via cross referencing with the database;
immutably recording in a blockchain ledger, information about the hard drives provided to the dismantling system and monitored by the scanning system, which information includes at least the number, type and contract value of each hard drive identified by the scanning system; and automatically processing a payment, in either fiat currency or cryptocurrency, to the customer based on the number, type and contract value of each hard drive identified by the scanning system via a processing system integrated with the blockchain ledger.

2. The method of claim 1, wherein the database includes constituent materials for each hard drive, further comprising a step of automatically generating a list of the constituent materials for each of the hard drives identified by the scanning system.

3. The method of claim 2, further comprising a step of identifying and generating values for said constituent materials.

4. The method of claim 3, further comprising a step of compiling a market database of current values for hard drive components.

5. The method of claim 1, further comprising a step of automatically monitoring in real time operating parameters of the dismantling system.

6. The method of claim 5, further comprising terminating operation of said dismantling system in response to a predetermined event identified by said monitoring.

7. The method of claim 1, wherein the database includes constituent materials for each hard drive, including rare earth components, further comprising identifying the rare earth components in said constituent materials of the hard drive identified by the scanning system.

8. The method of claim 1, wherein the scanning system includes a barcode reader to read one or more barcodes present on a hard drive, a visioning system for identifying a hard drive, or both.

9. A method of managing a dismantling system for automatically dismantling an electronic device into components, comprising steps of:

providing a database of identities of a plurality of electronic devices and one or more corresponding key characteristics of each electronic device of the plurality of electronic devices, the one or more corresponding key characteristics including one or more types of materials contained within each electronic device of the plurality of electronic devices;

automatically monitoring in real time, electronic devices provided to the dismantling system via a scanning system in operative communication with the database, which monitoring includes tracking a number and identifying a type of electronic device via cross referencing with the database;

monitoring a current value of each of the types of materials in real time using software;

calculating an estimated value of each electronic device monitored by the scanning system via the software using the current value of each of the types of materials contained within the respective electronic devices; and immutably recording in a blockchain ledger integrated with the software and scanning system, information about the electronic devices provided to the dismantling system and monitored by the integrated software, which information includes at least the number, identity and estimated value of each electronic device identified by the scanning system.

10. The method of claim 9, further comprising a step of automatically monitoring in real time operating parameters of the dismantling system.

11. The method of claim 9, further comprising a step of automatically processing a payment, in either fiat currency or cryptocurrency, to a customer based on the number, type and a contract value of each electronic device identified by the scanning system via a processing system integrated with the blockchain ledger.

12. The method of claim 9, wherein the scanning system includes one or both of a barcode reader to read one or more barcodes present on an electronic device and a visioning system for identifying an electronic device.

13. The method of claim 9, further comprising a step of automatically processing a payment, in either fiat currency or cryptocurrency, to a customer based on the number, type and a contract value of each electronic device identified by the scanning system via a processing system integrated with a blockchain ledger.

14. A method of managing a dismantling system for automatically dismantling an electronic device into subcomponents, comprising steps of:

providing a database of identities of a plurality of electronic devices and one or more corresponding key characteristics of each electronic device of the plurality of electronic devices, the one or more corresponding key characteristics including one or more types of materials contained within each electronic device of the plurality of electronic devices;

automatically monitoring in real time, electronic devices provided to the dismantling system via a scanning system in operative communication with the database, which monitoring includes tracking a number and identifying a type of electronic device via cross referencing with the database;

monitoring a current value of each of the types of materials in real time using software;

calculating an estimated value of each electronic device monitored by the scanning system via the software using the current value of each of the types of materials contained within the respective electronic devices; and automatically determining whether to (i) dismantle the electronic device into key subcomponents, (ii) extract targeted materials from the electronic device, or (iii) process the electronic device for reuse, via the software based on the calculated estimated value.

15. The method of claim 14, further comprising a step of compiling a market database of current values for said processed electronic devices.

16. The method of claim 14, further comprising a step of automatically monitoring in real time operating parameters of the system.

17. The management method of claim 16 further comprising terminating operation of said dismantling system in response to a predetermined event identified by said monitoring.

18. The method of claim 14, wherein the scanning system includes one or both of a barcode reader to read one or more barcodes present on an electronic device and a visioning system for identifying an electronic device.

* * * * *